(12) United States Patent
Haban et al.

(10) Patent No.: US 11,338,866 B2
(45) Date of Patent: May 24, 2022

(54) MOVABLE FRONT SHIELD FOR VEHICLES

(71) Applicant: UATC, LLC, San Francisco, CA (US)

(72) Inventors: Philipp Haban, Pittsburgh, PA (US); Daniel Adam Kanitz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 824 days.

(21) Appl. No.: 16/013,361

(22) Filed: Jun. 22, 2018

(65) Prior Publication Data

US 2019/0367102 A1 Dec. 5, 2019

Related U.S. Application Data

(60) Provisional application No. 62/678,320, filed on May 31, 2018.

(51) Int. Cl.
| | | |
|---|---|---|
| *B62D 33/08* | (2006.01) | |
| *G05D 1/02* | (2020.01) | |
| *B62D 35/00* | (2006.01) | |
| *B60Q 1/28* | (2006.01) | |

(52) U.S. Cl.
CPC .............. *B62D 33/08* (2013.01); *B60Q 1/28* (2013.01); *B62D 35/001* (2013.01); *B62D 35/005* (2013.01); *G05D 1/021* (2013.01); *G05D 2201/0213* (2013.01)

(58) Field of Classification Search
CPC .... B62D 33/08; B62D 35/005; B62D 35/001; B62D 37/02; G05D 1/021; G05D 2201/0213; B60Q 1/28; B60Q 1/0035; B60Q 1/2661
See application file for complete search history.

(56) References Cited

U.S. PATENT DOCUMENTS

| | | | |
|---|---|---|---|
| 3,278,221 A | 10/1966 | Jaulmes | |
| 4,089,542 A | 5/1978 | Westerman | |
| 4,102,548 A * | 7/1978 | Kangas | B62D 35/001 105/1.2 |
| 4,340,124 A | 7/1982 | Leonard | |
| 5,317,880 A * | 6/1994 | Spears | B62D 35/001 188/264 A |

(Continued)

OTHER PUBLICATIONS

Stephen Edelstein, Einride's T-Pod Self-driving truck is a cargo-hauling box on wheels, https://www.digitaltrends.com/cars/einride-t-pod-self-driving-truck/ (Year: 2017).*

(Continued)

*Primary Examiner* — Sze-Hon Kong
(74) *Attorney, Agent, or Firm* — Dority & Manning, P.A.

(57) ABSTRACT

In one example embodiment, a computer-implemented method for autonomous vehicle control includes determining whether a cargo container is attached to the vehicle base. The method includes controlling a front shield associated with an autonomous vehicle to move from a closed position to an opened position when a cargo container is determined to be attached to a vehicle base associated with the autonomous vehicle. The method includes controlling the front shield to move from the opened position to the closed position when the cargo container is not attached to the vehicle base.

20 Claims, 17 Drawing Sheets

SIDE VIEW

(56) References Cited

U.S. PATENT DOCUMENTS

| | | | | |
|---|---|---|---|---|
| 5,340,187 A * | 8/1994 | Haddad, Jr. | B60J 7/085 | 160/71 |
| 5,613,814 A * | 3/1997 | Jackson | B60P 7/13 | 410/69 |
| 5,730,483 A | 3/1998 | Greger | | |
| 5,829,946 A * | 11/1998 | McNeilus | B60P 7/13 | 414/495 |
| 6,237,981 B1 * | 5/2001 | Selleck | B60N 2/24 | 296/39.2 |
| 7,111,891 B2 * | 9/2006 | O'Brian | B60J 7/085 | 296/100.1 |
| 7,246,835 B1 * | 7/2007 | Colburn | B60P 3/42 | 280/775 |
| 7,281,750 B1 | 10/2007 | Wise | | |
| 7,370,904 B2 * | 5/2008 | Wood, Jr. | B60J 7/085 | 296/100.14 |
| 7,950,675 B1 * | 5/2011 | Quenzi | B60P 1/027 | 280/6.157 |
| 7,992,666 B2 | 8/2011 | Otterstrom | | |
| 8,128,064 B2 * | 3/2012 | Franzen | B66F 9/063 | 254/9 C |
| 8,152,216 B2 * | 4/2012 | Howell | B60J 7/085 | 296/98 |
| 8,157,492 B2 * | 4/2012 | Franzen | B60P 7/13 | 410/69 |
| 8,651,547 B2 * | 2/2014 | Alguera Gallego | B60J 7/1614 | 296/26.05 |
| 8,789,635 B2 * | 7/2014 | Franzen | B60L 50/66 | 180/68.5 |
| 8,894,088 B2 | 11/2014 | Lark, Jr. et al. | | |
| 8,996,159 B2 * | 3/2015 | Franzen | B65G 63/004 | 700/229 |
| 9,446,656 B2 * | 9/2016 | Alder | B60J 7/085 | |
| 9,522,623 B2 * | 12/2016 | Franzen | B60P 1/6418 | |
| 10,336,168 B2 * | 7/2019 | Teichrob | B65D 88/125 | |
| 10,358,023 B2 * | 7/2019 | Hegewald | B60L 50/66 | |
| 10,384,592 B1 * | 8/2019 | Royt | B60P 7/132 | |
| 2008/0202402 A1 * | 8/2008 | Giles | B63J 99/00 | 114/72 |
| 2009/0074545 A1 * | 3/2009 | Lert, Jr. | B65G 1/0492 | 414/276 |
| 2010/0052357 A1 * | 3/2010 | Howell | B60J 7/085 | 296/98 |
| 2011/0079166 A1 * | 4/2011 | Popa-Simil | B60L 50/60 | 105/1.4 |
| 2012/0192779 A1 * | 8/2012 | Teppig, Jr. | B65D 88/00 | 114/256 |
| 2012/0208431 A1 * | 8/2012 | Screnci | A63H 17/44 | 446/476 |
| 2012/0242108 A1 * | 9/2012 | Alguera Gallego | B62D 35/001 | 296/180.5 |
| 2012/0261946 A1 * | 10/2012 | Steel | B62D 35/001 | 296/180.5 |
| 2012/0321423 A1 * | 12/2012 | MacKnight | H01L 21/67724 | 414/664 |
| 2014/0017045 A1 * | 1/2014 | Wieschemann | B60K 1/04 | 414/460 |
| 2014/0360796 A1 | 12/2014 | Theodore et al. | | |
| 2014/0361580 A1 * | 12/2014 | Flynn | B62D 35/001 | 296/180.3 |
| 2016/0009320 A1 | 1/2016 | Ahn et al. | | |
| 2016/0214660 A1 * | 7/2016 | Conny | B62D 35/001 | |
| 2016/0362033 A1 * | 12/2016 | Hegewald | B60P 1/6445 | |
| 2017/0182923 A1 * | 6/2017 | Hegewald | B60P 3/40 | |
| 2017/0217293 A1 * | 8/2017 | Kim | B60P 7/02 | |
| 2017/0357026 A1 * | 12/2017 | Gallagher | B65G 67/603 | |
| 2018/0120863 A1 * | 5/2018 | Barra | B60J 7/08 | |
| 2018/0148107 A1 * | 5/2018 | Burrows | B62D 37/02 | |
| 2018/0319263 A1 * | 11/2018 | Hegewald | B60K 1/04 | |
| 2018/0330325 A1 * | 11/2018 | Sibley | B66F 9/0755 | |
| 2019/0287063 A1 * | 9/2019 | Skaaksrud | B60W 30/09 | |
| 2020/0150686 A1 * | 5/2020 | Wieschemann | G05D 1/0212 | |
| 2020/0388159 A1 * | 12/2020 | Degerman | G08G 1/163 | |

OTHER PUBLICATIONS

Gaussin, Self-Driving Automated Vehicles, http://web.archive.org/web/20180711132339/http://www.gaussin.com/self-driving-automated-vehicles/?lang=en (Year: 2018).*

* cited by examiner

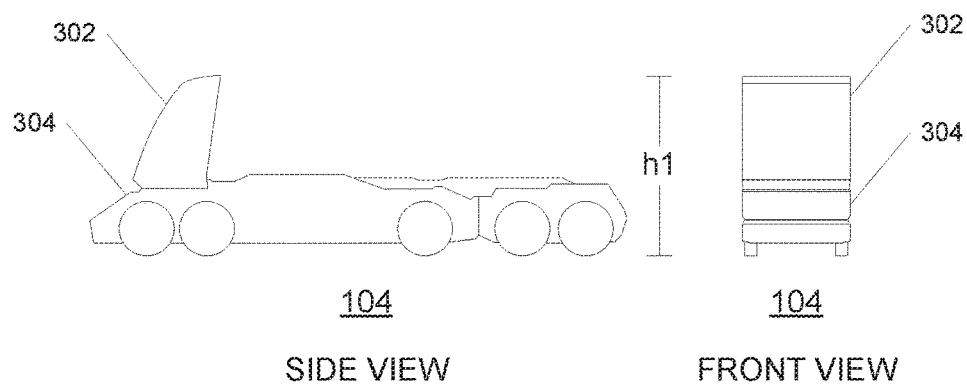
FIG. 4A  SIDE VIEW  FRONT VIEW
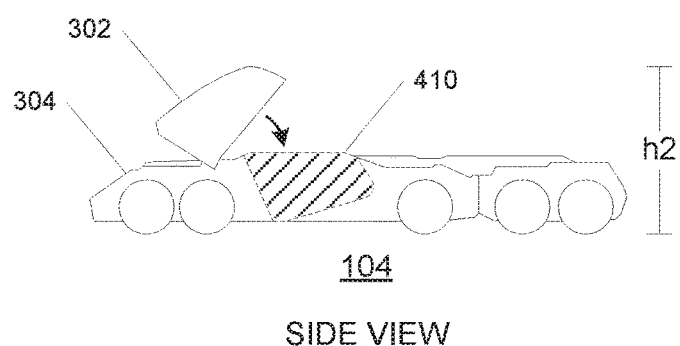
FIG. 4B  SIDE VIEW
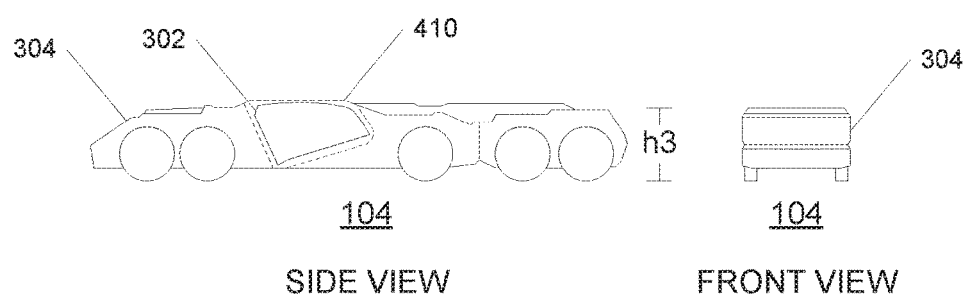
FIG. 4C  SIDE VIEW  FRONT VIEW
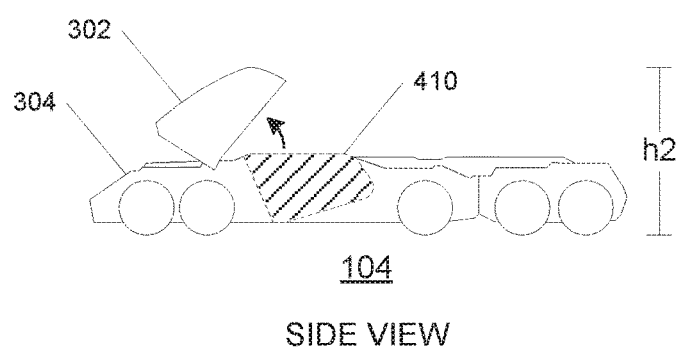
FIG. 4D  SIDE VIEW

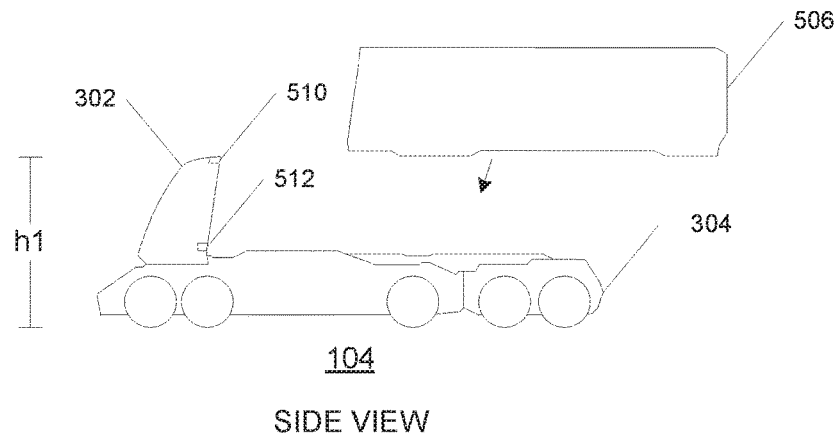
FIG. 5A SIDE VIEW
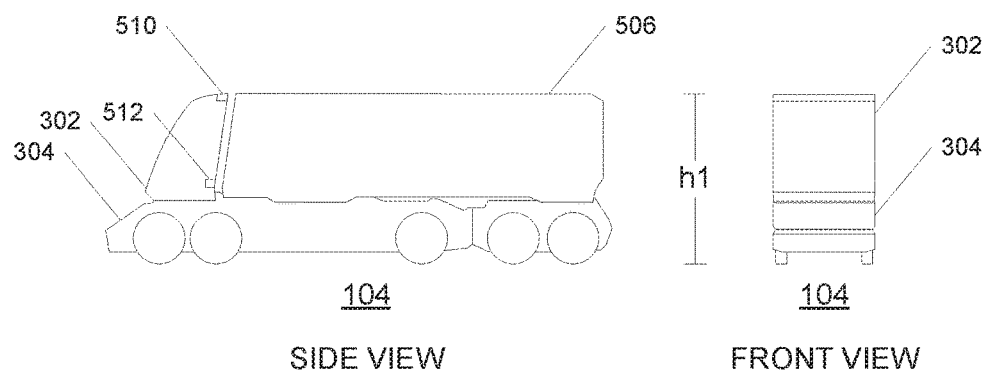
FIG. 5B SIDE VIEW    FRONT VIEW
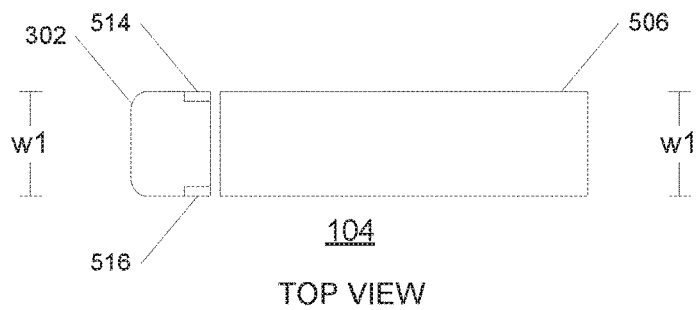
FIG. 5C TOP VIEW

SIDE VIEW

TOP VIEW

SIDE VIEW

SIDE VIEW

FRONT VIEW

SIDE VIEW

SIDE VIEW

SIDE VIEW

SIDE VIEW

SIDE VIEW

SIDE VIEW

SIDE VIEW

SIDE VIEW

SIDE VIEW

SIDE VIEW

SIDE VIEW

MOVABLE FRONT SHIELD FOR VEHICLES

PRIORITY CLAIM

The present application is based on and claims the benefit of U.S. Provisional Patent Application No. 62/678,320, having a filing date of May 31, 2018, which is incorporated by reference herein.

FIELD

The present disclosure relates generally to controlling an autonomous vehicle and, more particularly, to systems and methods for opening and closing a movable front shield associated with the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of an environment proximate to the autonomous vehicle, the autonomous vehicle can identify an appropriate motion plan through such environment. One or more of such autonomous vehicles can be used to provide a vehicle-based service in which an autonomous vehicle(s) can autonomously navigate through an environment between a starting location and an ending location of the provided service.

SUMMARY

Aspects and advantages of the present disclosure will be set forth in part in the following description, or may be learned from the description, or may be learned through practice of the embodiments.

One example aspect of the present disclosure is directed to an autonomous vehicle. The autonomous vehicle includes a vehicle base having a section defining a holding space, a front shield movably attached to the vehicle base, one or more processors, and one or more tangible, non-transitory, computer readable media that collectively store instructions that when executed by the one or more processors cause the computing system to perform operations. The operations include determining whether a cargo container is attached to the vehicle base. The operations include, in response to determining that the cargo container is attached to the vehicle base, controlling the front shield to move to an opened position that shields a forward end of the cargo container. The operations include, in response to determining that the cargo container is not attached to the vehicle base, controlling the front shield to move to a closed position to reduce a vertical profile of the autonomous vehicle. At least a portion of the front shield folds into the holding space of the vehicle base in the closed positon.

Another example aspect of the present disclosure is directed to an autonomous vehicle. The autonomous vehicle can have a vehicle base that includes a first attachment point for attaching a cargo container. The autonomous vehicle can have a front shield that is movably attached to the vehicle base at a second attachment point located forward of the second attachment point relative to a forward direction of travel of the autonomous vehicle. The front shield is configured to move between an opened position and a closed position. The autonomous vehicle can have a folding system configured to move the front shield between the opened position and the closed position.

Yet another example aspect of the present disclosure is directed to a computer-implemented method for controlling an autonomous vehicle. The method includes controlling a front shield associated with an autonomous vehicle to move from a closed position to an opened position when a cargo container is attached to a vehicle base associated with the autonomous vehicle. The method includes controlling the front shield to move from the opened position to the closed position when the cargo container is not attached to the vehicle base.

Other example aspects of the present disclosure are directed to systems, methods, vehicles, apparatuses, tangible, non-transitory computer-readable media, and memory devices for controlling or managing operations of autonomous vehicles when providing a vehicle-based service.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIGS. 4A-4D depict an example of a vehicle with a movable front shield according to example embodiments of the present disclosure;

FIGS. 5A-5C depict an example of attaching a cargo container to a vehicle according to example embodiments of the present disclosure;

Figure 1:
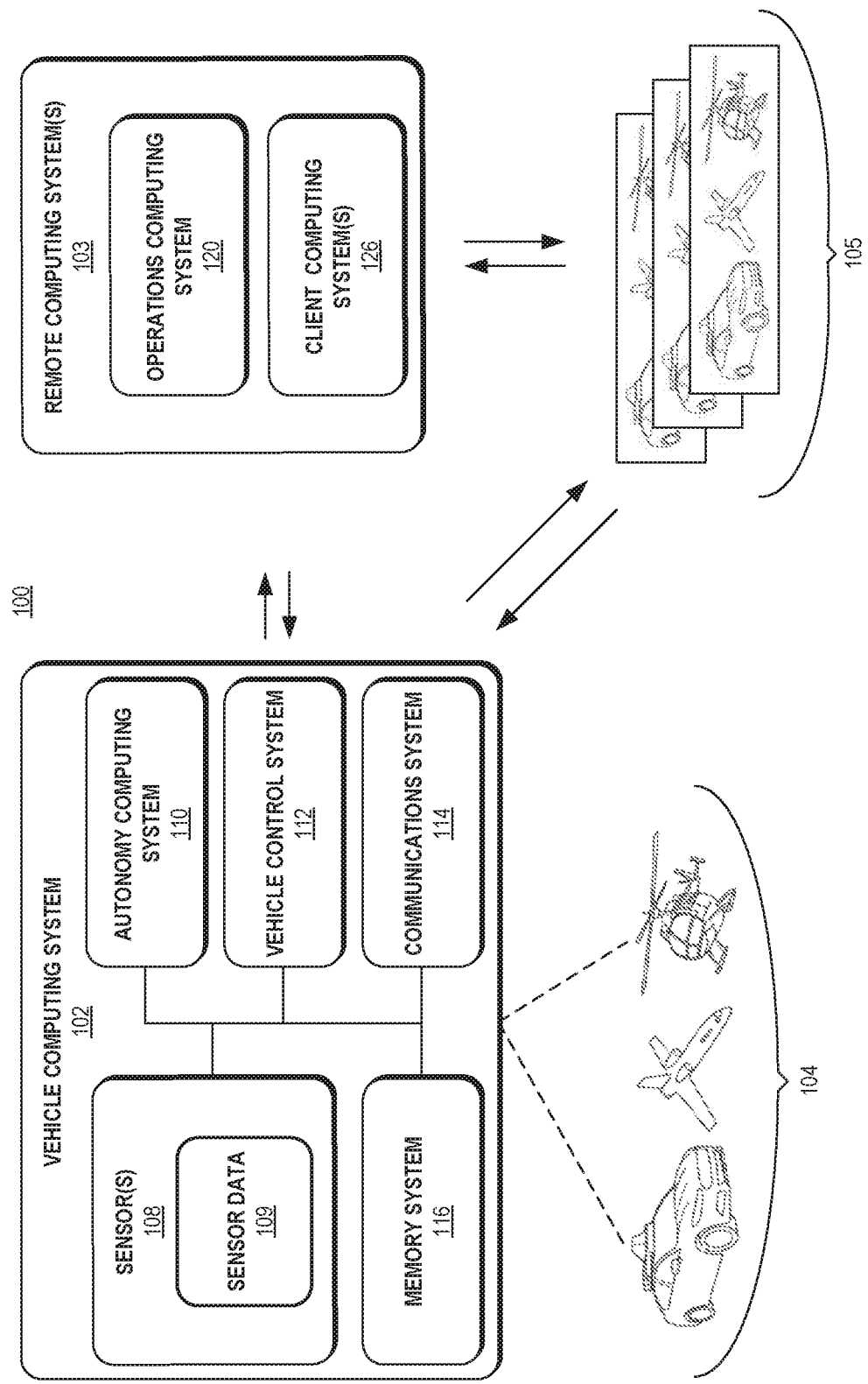
FIG. 1 depicts an example system overview according to example embodiments of the present disclosure.

Reference numerals that are repeated across plural figures are intended to identify the same components or features in various implementations.

DETAILED DESCRIPTION

Example aspects of the present disclosure are directed to a vehicle (e.g., an autonomous truck) that includes an adjustable front shield. For instance, an entity (e.g., a service provider network) can coordinate, direct, or operate a fleet of vehicles to transport cargo and provide a vehicle-based service (e.g., a transportation service). The fleet can include, for example, autonomous vehicles that can drive, navigate, operate, etc. with minimal and/or no interaction from a human driver. The service provider network can operate an autonomous vehicle in the fleet to transport cargo in the form of a cargo container (e.g., shipping container). The cargo container will typically have poor aerodynamic properties (e.g., large flat surfaces in a box-like configuration) that detrimentally affect the aerodynamics of the autonomous vehicle when transporting the cargo container. The autonomous vehicle can include a front shield that is positioned in front of the cargo container to reduce the detrimental effect and improve the aerodynamics of the autonomous vehicle when transporting the cargo container. However, when the service provider network operates the autonomous vehicle without transporting a cargo container (e.g., to travel to a location to pick-up a cargo container), the front shield can instead reduce the aerodynamic properties of the autonomous vehicle. The present disclosure provides an adjustable front shield that can be moved to an opened or "shielding" position when the autonomous vehicle is transporting a cargo container, and that can be moved to a closed or "aerodynamic" position when the autonomous vehicle is not transporting a cargo container. In this way, the autonomous vehicle can be configured to achieve optimal aerodynamics both when the autonomous vehicle is transporting cargo and when the autonomous vehicle is not transporting cargo. Systems and methods of the present disclosure provide for an autonomous vehicle that includes a vehicle base, an adjustable front shield, and a folding system for moving the front shield between its opened and closed positions.

In some implementations, the service provider (e.g., via the operations computing system) can communicate with the service provider network to request an allocation of capacity at a transfer hub for receiving one or more assets.

More particularly, a service provider network can operate a fleet of one or more vehicles (e.g., ground-based vehicles) to provide a vehicle-based service, such as a transportation service, courier service, delivery service, or freight service. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). In some implementations, the autonomous vehicles can operate in an autonomous mode. For example, the vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. In some implementations, the autonomous vehicles can operate in a manual mode. For example, a human operator (e.g., a driver) can manually control the autonomous vehicle. Moreover, the autonomous vehicle can be configured to communicate with one or more computing device(s) that are remote from the vehicle. As an example, the autonomous vehicle can communicate with an operations computing system that can be associated with the service provider network. The operations computing system can help the service provider network monitor, communicate with, manage, etc. the fleet of vehicles. As another example, the autonomous vehicle can communicate with one or more other vehicles (e.g., a vehicle computing system onboard each of the one or more other vehicles in the fleet), one or more other computing systems associated with the service provider network, and/or any other suitable remote computing system(s). In some implementations, the operations computing system can mediate communication between the autonomous vehicle and the computing device(s) that are remote from the vehicle.

According to aspects of the present disclosure, an autonomous vehicle can include a vehicle base. The vehicle base can be configured to support a cargo container so that the autonomous vehicle can transport the cargo container from a first location to a second location. The vehicle base can include a chassis or frame that supports various vehicle components. For example, the front end of the vehicle base can support an engine, transmission, and other vehicle components; and the back end of the vehicle base can be configured similar to a trailer bed and defines a flat or planar support structure for accommodating a cargo container. The chassis of the vehicle base can be coupled to a plurality of wheels. The autonomous vehicle can also include a front shield attached to the vehicle base. The front shield can be positioned to shield the cargo container when the autonomous vehicle is transporting the cargo container. In particular, the front shield can be positioned to shield areas of the cargo container that can detrimentally effect the aerodynamics of the autonomous vehicle when the autonomous vehicle is transporting the cargo container.

In some implementations, the front shield can be adjusted to accommodate different shapes and/or sizes of a cargo container being transported by the autonomous vehicle. The shape and/or size of a cargo container can vary in height and/or width. The front shield can include various components to enable such adjustments to shield areas of the cargo container that can detrimentally effect the aerodynamics of the autonomous vehicle when the autonomous vehicle is transporting the cargo container (e.g., the front end or nose of the cargo container).

As an example, the front shield can be attached to the vehicle base via a height adjustable platform. When a cargo container is attached to the vehicle base of the autonomous vehicle, a height of the front shield can be raised or lowered to shield a top portion of the cargo container.

As another example, the front shield can include expandable panels that can be incrementally expanded. When a cargo container is attached to the vehicle base of the autonomous vehicle, the panels can be expanded to shield the cargo container. In particular, the panels can be expanded to an appropriate level based on the cargo container in order to shield the cargo container.

In some implementations, the front shield can be adjusted to create different aerodynamic configurations.

As an example, the front shield can include articulating panels that can be articulated at different points within each panel. The articulating panels can be adjusted at the different points to create different shapes (e.g., different surface angles, different surface curves, etc.).

As another example, the front shield can include a flexible membrane stretched over an articulating structure. The articulating structure can be adjusted to create different shapes with the flexible membrane that is stretched over the structure.

According to aspects of the present disclosure, a front shield of an autonomous vehicle can include one or more sensors and/or one or more marking lights. The sensor(s) can be used to provide sensor data to a vehicle computing system onboard the autonomous vehicle so that the vehicle computing system can attempt to comprehend the environment proximate to the autonomous vehicle by performing various processing techniques on the sensor data in order to generate an appropriate motion plan through the environment. The sensor(s) can be configured to provide sensor data that corresponds to a particular field of view of the environment based on a position of the sensor(s) with respect to the autonomous vehicle. The marking light(s) can be used to mark surfaces of the autonomous vehicle for an observer viewing the autonomous vehicle. In particular, the marking light(s) can indicate a type of the autonomous vehicle (e.g., car, truck, etc.) and a size of the autonomous vehicle (e.g., width, height, etc.) to the observer.

As an example, the front shield can include a front-facing camera that can provide sensor data indicative of objects in an environment in front of the autonomous vehicle. The camera can be configured to provide sensor data that corresponds to a particular field of view of the environment based on a height and orientation of the camera with respect to the autonomous vehicle.

As another example, a top portion of the front shield can include a LIDAR that can provide sensor data indicative of an environment proximate to the autonomous vehicle. The LIDAR can be configured to provide sensor data that corresponds to a particular field of view based on a height and orientation of the LIDAR with respect to the autonomous vehicle.

As another example, each side of the front shield can include a marking light. A marking light on the left and right side of the front shield can indicate a width of the autonomous vehicle, and a marking light on the top of the front shield can indicate a height of the autonomous vehicle.

According to aspects of the present disclosure, a front shield of an autonomous vehicle can be movably attached to a vehicle base of the autonomous vehicle, and the autonomous vehicle can include a folding system that can fold or move the front shield between its opened and closed positions. The folding system can include various components to enable moving or actuating the front shield, such as, for example, hydraulic actuators, linear actuators, mechanical/electromagnetic latches, trapezoidal threads, etc. The autonomous vehicle can use the folding system to adjust a configuration of one or more sensors and/or one or more marking lights associated with the front shield when opening and/or closing the front shield.

In some implementations, the autonomous vehicle can move the front shield to its opened position when the autonomous vehicle is transporting a cargo container, and fold the front shield down to its closed position when the autonomous vehicle is not transporting a cargo container. The front shield can be positioned in a substantially vertical orientation in its opened position, and positioned in a substantially horizontal orientation in its closed position. Additionally, the front shield can be configured such that it is substantially flush with the vehicle base when the front shield is in its closed position. In some implementations, the vehicle base can include a holding space for holding the front shield when it is in its closed position. By moving the front shield to its closed position when the autonomous vehicle is not transporting cargo, a vertical profile associated with the autonomous vehicle can be reduced with respect to a vertical profile of the autonomous vehicle when a cargo container is attached.

As an example, when the autonomous vehicle is transporting cargo, the autonomous vehicle can move the front shield to its opened position in order to shield areas of the cargo container that can detrimentally affect the aerodynamics of the autonomous vehicle. The autonomous vehicle can also adjust the front shield to accommodate different shapes and/or sizes of a cargo container being transported by the autonomous vehicle.

As another example, when the autonomous vehicle is not transporting a cargo container, the autonomous vehicle can fold the front shield down into the vehicle base of the autonomous vehicle. By closing the front shield, the autonomous vehicle can reduce a surface area facing the environment in a direction of motion, and thereby improve the aerodynamics of the autonomous vehicle.

In some implementations, the autonomous vehicle can dynamically adjust a configuration of the sensor(s) associated with the front shield in response to closing or opening the front shield. The sensor(s) can be provided with an independent actuator assembly for adjusting the configuration of the sensor(s) independently from one or more other sensor(s). As an example, one or more actuators associated with the folding system can generate data indicative of a position of the front shield (e.g., opened, closed, or between opened and closed; and an adjusted/expanded height when opened). The actuator(s) can provide the data to a vehicle computing system onboard the autonomous vehicle, and the vehicle computing system can determine a position (e.g., height and/or orientation) of the sensor(s) with respect to the autonomous vehicle. The vehicle computing system can dynamically adjust a configuration of the sensor(s) based on the determined position so that the sensor(s) can continue providing sensor data that corresponds to a particular field of view.

As another example, a vehicle computing system onboard the autonomous vehicle can analyze sensor data captured by the sensor(s) to determine a change in a field of view associated with the sensor(s). The vehicle computing system can detect the change in the field of view based on, for example, a detection/recognition of one or more objects in the sensor data, a change in location of a ground level in the sensor data, etc. The vehicle computing system can dynamically adjust a configuration of the sensor(s) to correct for the detected change in the field of view so that the sensor(s) can continue providing sensor data that corresponds to a particular field of view.

As another example, the front shield can include one or more supplemental sensors that can detect a change in position and/or orientation (e.g., gyroscope, accelerometer, etc.). The supplemental sensor(s) can provide supplemental sensor data indicative of the change in position and/or orientation based on a position of the front shield (e.g., opened, closed, or between opened and closed; and an adjusted/expanded height when opened). A vehicle computing system onboard the autonomous vehicle can analyze the supplemental sensor data to determine a change in a field of view associated with the sensor(s), and dynamically adjust a configuration of the sensor(s) associated with the front shield to correct for the determined change in the field of view so that the sensor(s) can continue providing sensor data that corresponds to a particular field of view of the environment.

In some implementations, the autonomous vehicle can dynamically adjust the marking light(s) associated with the front shield in response to closing or opening the front shield. The marking light(s) can be provided with an independent actuator assembly for adjusting the marking light(s) independently from one or more other marking light(s).

As an example, if the front shield includes a front-facing marking light when the front shield is open, then the marking light may no longer be visible to an observer in front of the autonomous vehicle when the front shield is in its closed position. A vehicle computing system onboard the autonomous vehicle can determine a position (height and/or orientation) of the marking light based on a position of the front shield, and dynamically adjust the marking light to maintain visibility to the observer.

As another example, the front shield can include a first marking light and the vehicle base can include a second marking light. A vehicle computing system onboard the autonomous vehicle can enable the first marking light when the front shield is in its opened position in order to indicate a height of the autonomous vehicle when the front shield is opened, and the vehicle computing system can enable the second marking light when the front shield is closed in order to indicate a height of the autonomous vehicle when the front shield is closed.

In some implementations, the autonomous vehicle can move the front shield to its opened position in order to increase heat dissipation (e.g., when the autonomous vehicle is transporting a cargo container). For example, the front shield can include a cooling component. When the autonomous vehicle is transporting a cargo container, the autonomous vehicle can generate more heat than when the autonomous vehicle is not transporting a cargo container. By including the cooling component in the front shield and opening the front shield when the autonomous vehicle is transporting cargo, the increased heat generated by the autonomous vehicle can be dissipated faster. Alternatively, when the autonomous vehicle is operating in a high temperature environment, the autonomous vehicle can move the front shield to its opened position in order to dissipate heat via the cooling component even when the autonomous vehicle is not transporting cargo. In this way, when the autonomous vehicle generates more heat and/or when the autonomous vehicle needs to dissipate generated heat more quickly, the autonomous vehicle can move the front shield to its opened position in order to dissipate the heat via the cooling component.

The systems and methods described herein may provide a number of technical effects and benefits. For instance, by opening a front shield of an autonomous vehicle to shield areas of a cargo container, the aerodynamics of the autonomous vehicle can be improved when the autonomous vehicle is transporting the cargo container, and by closing the front shield of the autonomous vehicle when a cargo container is not being transported, the aerodynamics of the autonomous vehicle can also be improved when the autonomous vehicle is not transporting the cargo container. In this way, the present disclosure enables improved aerodynamics of the autonomous vehicle both when the autonomous vehicle is transporting the cargo container and when the autonomous vehicle is not transporting the cargo container. Additionally, by enabling the front shield to be adjusted to accommodate different sizes of cargo containers, the autonomous vehicle can fill in or cover any gaps between the front shield and the cargo container. In this way, the present disclosure enables further improvement to the aerodynamics of the autonomous vehicle when the autonomous vehicle is transporting a cargo container.

Additionally, by including a folding system that can determine a position of the front shield (e.g., an opened position, closed position, or between the opened and closed positions), the autonomous vehicle can determine a change in position (e.g., height and/or orientation) that can affect one or more sensors and/or one or more marking lights that are associated with the front shield. By correcting a configuration of the sensor(s) and/or marking light(s) based the change in position of the front shield, the present disclosure enables the autonomous vehicle to seamlessly transition between an opened and closed position of the front shield while the autonomous vehicle is in motion.

The systems and methods described herein may also provide resulting improvements to computing technology tasked with controlling an autonomous vehicle. For example, the systems and methods described herein may provide improvements in a utilization of the fleet of vehicles for providing the vehicle-based service, resulting in reduced energy expenditure, increased travel range, and improved efficiency.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. The system 100 can also include one or more vehicle(s) 105, each including a respective vehicle computing system (not shown).

In some implementations, the system 100 can include one or more remote computing systems 103 that are remote from the vehicle 104 and the vehicle(s) 105. The remote computing system(s) 103 can include an operations computing system 120, one or more client computing system(s) 122. The remote computing system(s) 103 can be separate from one another or share computing device(s).

In some implementations, the vehicle 104 can be part of a fleet of vehicles operated by the operations computing system 120. The fleet of vehicles can include the vehicle(s) 105.

The operations computing system 120 can operate the vehicle 104 via the vehicle computing system 102, and operate the vehicle(s) 105 via the respective vehicle computing system for each vehicle. The operations computing system 120 can obtain data indicative of a vehicle service request from a client, for example, via the client computing system 122. The operations computing system 120 can select the vehicle 104 (or one of the vehicle(s) 105) to provide the vehicle service for the client. In particular, if the vehicle service is a transportation service, then the operations computing system 120 can control the vehicle 104 to receive a cargo container and to transport the cargo container to a destination. The operations computing system can send data indicative of the cargo container to the vehicle computing system 102. The data indicative of the cargo container can include, for example, an indication that the cargo container will be attached to the vehicle 104, one or more dimensions of the cargo container (e.g., height, width, length), a weight of the cargo container, etc. The vehicle computing system 102 can receive the data indicative of the cargo container and prepare the vehicle 104 to receive the cargo container (e.g., move a front shield of the vehicle 104 from a closed position to an opened position).

The vehicle 104 incorporating the vehicle computing system 102 can be a ground-based autonomous vehicle (e.g., car, truck, bus, etc.). The vehicle 104 can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

As shown in FIG. 1, the vehicle 104 can include one or more sensors 108, an autonomy computing system 110, a vehicle control system 112, a communications system 114, and a memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, cargo containers, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

Figure 2:
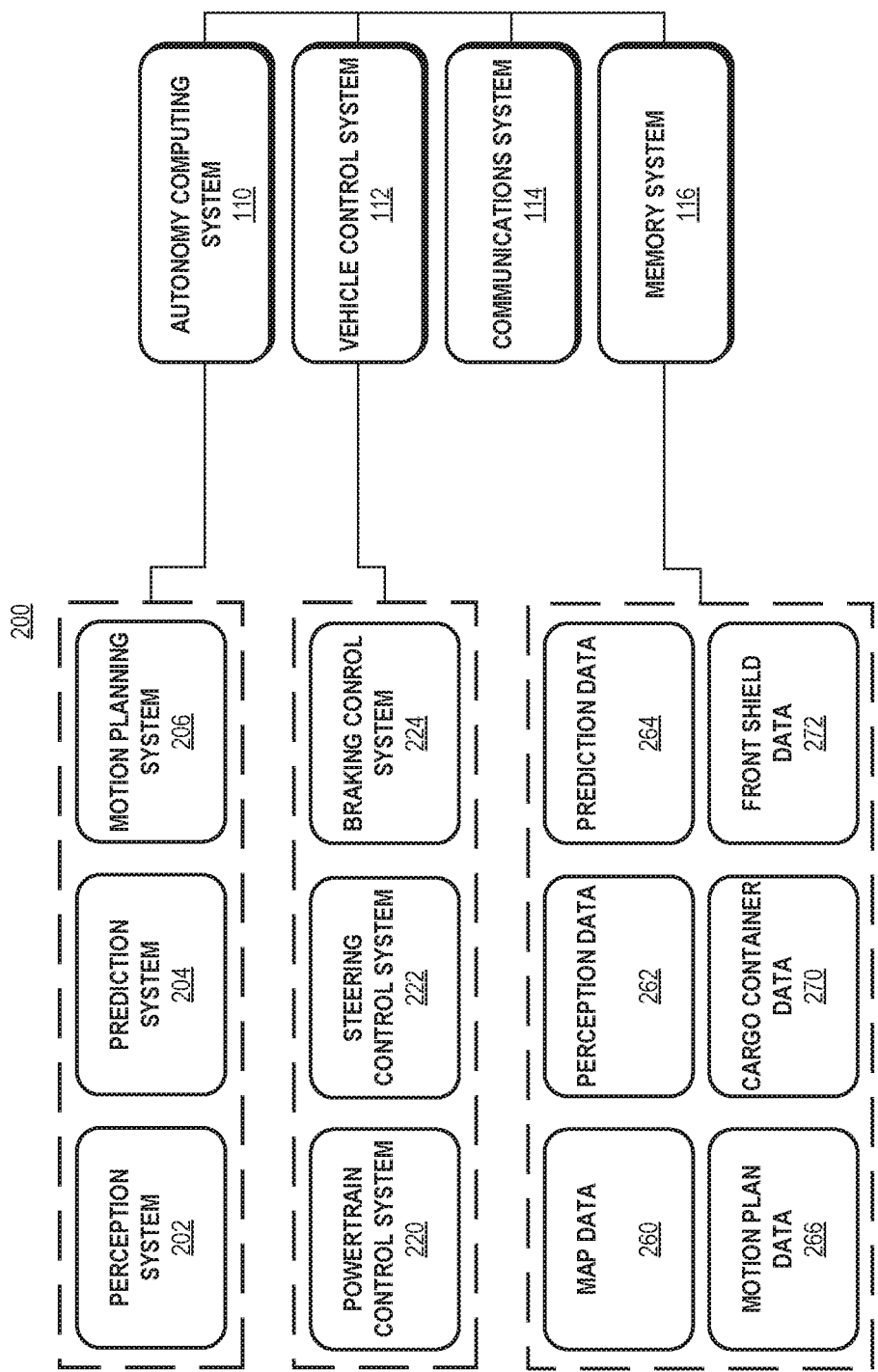
FIG. 2 depicts an example vehicle computing system according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with one or more other computing systems (e.g., remote computing system(s) 103, vehicle(s) 105). The vehicle computing system 102 can use the communications system 114 to communicate with the operations computing system 120 and/or one or more other remote computing system(s) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), such as, for example, transmitters, receivers, ports, controllers, antennas, and/or other suitable sub-systems that can help facilitate communication.

The memory system 116 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, cargo container data 270, and front shield data 272.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The cargo container data 270 can include data indicative of an attachment at a current time, detachment at a current time, attachment at a future time, and/or future detachment at a future time of a cargo container. The vehicle computing system 102 can receive the cargo container data 270 from the operations computing system 120. The cargo container data 270 can also include one or more attributes associated with a cargo container such as, for example, one or more dimensions (e.g., height, width, length), cargo weight, etc.

The front shield data 272 can include data indicative of a position (e.g., opened, closed, or between opened and closed; an adjusted/expanded height; etc.) of a front shield associated with the vehicle 104. The vehicle 104 can include one or more actuators associated with a folding system for the front shield, and the vehicle computing system 102 can obtain the front shield data 272 from the actuator(s) in order to determine the position of the front shield.

Figure 3A:
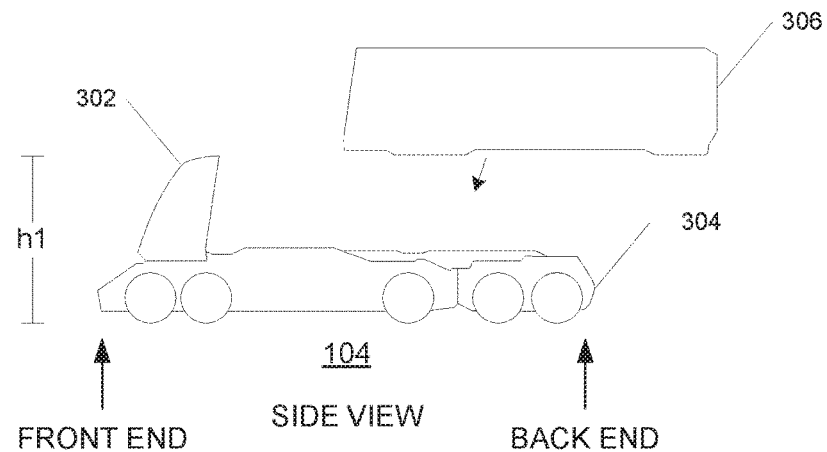
FIGS. 3A-3C depict an example of a vehicle according to example embodiments of the present disclosure.
Figure 3B:
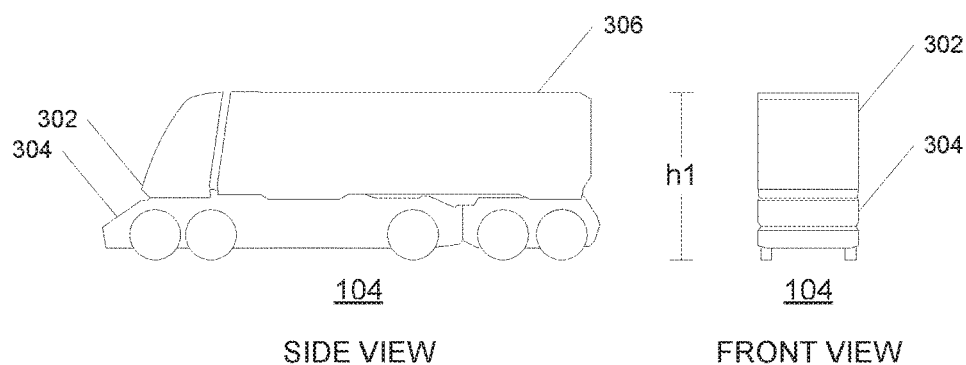
Figure 3C:
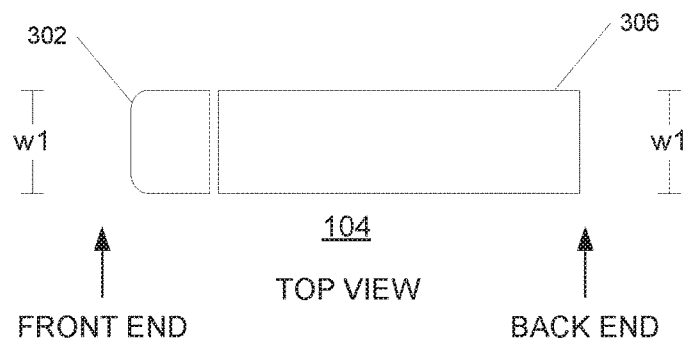

FIGS. 3A-3C depict an example of a vehicle according to example embodiments of the present disclosure. As shown in FIGS. 3A-3C, the vehicle 104 can include a front shield 302 and a vehicle base 304. The vehicle base 304 can be configured to support a cargo container 306 so that the vehicle 104 can transport the cargo container 306 from a first location to a second location. The vehicle base 304 can include a chassis or frame that supports various vehicle components. For example, the front end of the vehicle base 304 can support an engine, transmission, and other vehicle components; and the back end of the vehicle base 304 can be configured similar to a trailer bed and defines a flat or planar support structure for accommodating the cargo container 306. The chassis of the vehicle base 304 can be coupled to a plurality of wheels. The vehicle 104 can also include one or more attachment points for attaching the front shield 302 and the cargo container 306. In some implementations, the front shield 302 can be attached to the vehicle base 304 at a first attachment point, and the cargo container 306 can be attached to the vehicle base 304 at a second attachment point, with the first attachment point being located in front of the second attachment point relative to a forward direction of travel of the vehicle. The front shield 302 can be positioned to shield the cargo container 306 when the vehicle 104 is transporting the cargo. In particular, the front shield 302 can be positioned to shield areas of the cargo container 306 that can detrimentally effect the aerodynamics of the vehicle 104 when the vehicle 104 is transporting the cargo container 306. The front shield 302 can be adjusted to accommodate different shapes and/or sizes of a cargo container being transported by the vehicle 104, as will be discussed below with respect to FIGS. 6-11.

As shown in FIG. 3A, the front shield 302 can be positioned in a substantially vertical orientation when the front shield 302 is in its opened position. A height $h_1$ can represent a height of the vehicle 104 from ground level to the top of the front shield 302 when the front shield 302 is in its opened position.

As shown in FIG. 3B, the vehicle 104 and/or the cargo container 306 can be configured so that when the cargo container 306 is attached to the vehicle base 104, a height from ground level to the top of the cargo container 306 is the same as the height $h_1$. By configuring the front shield 302 and the cargo container 306 to be substantially flush in height, the front shield 302 can shield the cargo container 306 and not shield a region of space above the cargo container 306 that is not occupied by the cargo container 306.

As shown in FIG. 3C, a width $w_1$ can represent a width of the vehicle 104. The width $w_1$ can be the same as a width of the front shield 302. The vehicle 104 and/or the cargo container 306 can be configured so that when the cargo container 306 is attached to the vehicle base 104, a width of the cargo container 306 is the same as the width $w_1$. By configuring the front shield 302 and the cargo container 306 to be substantially flush in width, the front shield 302 can shield the cargo container 306 and not shield a region of space to the left or right of the cargo container 306 that is not occupied by the cargo container 306.

FIGS. 4A-4D depict an example of a vehicle with a movable front shield according to example embodiments of the present disclosure. As shown in FIGS. 4A-4D, the front shield 302 can be movably attached to the vehicle base 304 of the vehicle 104, and the vehicle 104 can include a folding system (not shown) that can fold or move the front shield 302 between its opened and closed positions. The folding system can include various components to enable moving or actuating the front shield 302, such as, for example, hydraulic actuators, linear actuators, mechanical/electromagnetic latches, trapezoidal threads, etc.

In some implementations, the vehicle computing system 102 can control the folding system to adjust a configuration of one or more sensors and/or one or more marking lights associated with the front shield 302 when opening and/or closing the front shield 302, as will be discussed further below with respect to FIGS. 12-15.

As shown in FIG. 4A, the front shield 302 can be positioned in a substantially vertical orientation when the front shield 302 is in its opened position. The height $h_1$ represents the height of the vehicle 104 from ground level to the top of the front shield 302 when the front shield 302 is in its opened position. The vehicle computing system 102 can position the front shield 302 to its opened position when the vehicle 104 is transporting a cargo container.

As shown in FIG. 4B, the vehicle computing system 102 can fold the front shield 302 down to its closed position when the vehicle 104 is not transporting a cargo container. The vehicle base 304 can include a holding space 410 for holding the front shield 302 when it is in its closed position. The holding space 410 can include a cavity within the vehicle base 304 that can hold at least part of the front shield 302. A height $h_2$ can represent a height of the vehicle 104 from ground level to the top of the front shield 302 when the front shield 302 is being moved to its closed position. The height $h_2$ can be less than the height $h_1$, and the height $h_2$ can decrease as the front shield 302 is moved from its opened position to its closed position. By closing the front shield 302, the vehicle computing system 102 can reduce a surface area of the vehicle 104 that is facing the environment in a direction of motion, and thereby improve the aerodynamics of the autonomous vehicle.

As shown in FIG. 4C, the front shield 302 can be positioned in a substantially horizontal orientation when the front shield 302 is in its closed position. A height $h_3$ can represent a height of the vehicle 104 from ground level to the top of the front shield 302 when the front shield 302 is in its closed position. The vehicle computing system 102 can position the front shield 302 to its closed position when the vehicle 104 is not transporting a cargo container. In some implementations, the front shield 302 can be positioned within the holding space 410 when the front shield 302 is in its closed position. Additionally, the front shield 302 can be configured such that it is substantially flush with the vehicle base 304 when the front shield 302 is in its closed position. In the case, the height $h_3$ can also represent a height of the vehicle 104 from ground level to the top of the vehicle base 304.

As shown in FIG. 4D, the vehicle computing system 102 can move the front shield 302 to its opened position when the vehicle 104 will be transporting a cargo container. The height $h_2$ represents the height of the vehicle 104 from ground level to the top of the front shield 302 when the front shield 302 is being moved to its opened position. The height $h_2$ can be greater than the height $h_3$ and less than the height $h_1$, and the height $h_2$ can increase as the front shield 302 is moved from its closed position to its opened position. By opening the front shield 302, the vehicle computing system 102 can shield areas of a cargo container that can detrimentally affect the aerodynamics of the autonomous vehicle.

FIGS. 5A-5C depict an example of attaching a cargo container to a vehicle according to example embodiments of the present disclosure.

As shown in FIG. 5A, the sensor(s) 108 can include cargo sensors 510 and 512 that can be configured to acquire sensor data 109 associated with a cargo container 506. The front shield 302 can include the sensors 510 and 512. The sensors 510 and 512 can acquire sensor data 109 that indicates when the cargo container 506 is securely attached to the vehicle base 304 and/or when the cargo container 506 is detached from the vehicle base 304. Additionally, the sensors 510 and 512 can acquire sensor data 109 that indicates a shape and/or size of the cargo container 506. The front shield 302 can be adjusted to accommodate different shapes and/or sizes of a cargo container being transported by the vehicle 104, as will be discussed below with respect to FIGS. 6-11.

As shown in FIG. 5B, when the cargo container 506 is securely attached to the vehicle base 304, the front shield 302 and the cargo container 506 can be substantially flush in height. The sensors 510 and 512 can acquire sensor data 109 indicating that the cargo container 506 is securely attached to the vehicle base 304 and that the cargo container 506 is associated with a shape and/or size (e.g., a standard shape and/or size) that causes the cargo container 506 to be substantially flush in height with the front shield 302.

As shown in FIG. 5C, the sensor(s) 108 can include cargo sensors 514 and 516 that can be configured to acquire sensor data 109 associated with the cargo container 506. The front shield 302 can include the sensors 514 and 516. The sensors 514 and 516 can acquire sensor data 109 that indicates a shape and/or size of the cargo container 506. When the cargo container 506 is securely attached to the vehicle base 304, the front shield 302 and the cargo container 506 can be substantially flush in width. The sensors 514 and 516 can acquire sensor data 109 indicating that the cargo container 506 is associated with a shape and/or size (e.g., a standard shape and/or size) that causes the cargo container 506 to be substantially flush in width with the front shield 302.

Figure 6A:
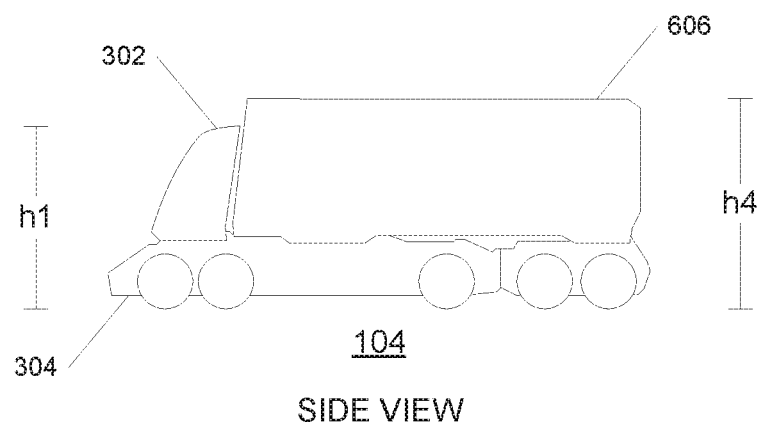
FIGS. 6A-6B d depict another example of attaching a cargo container to a vehicle according to example embodiments of the present disclosure.
Figure 6B:
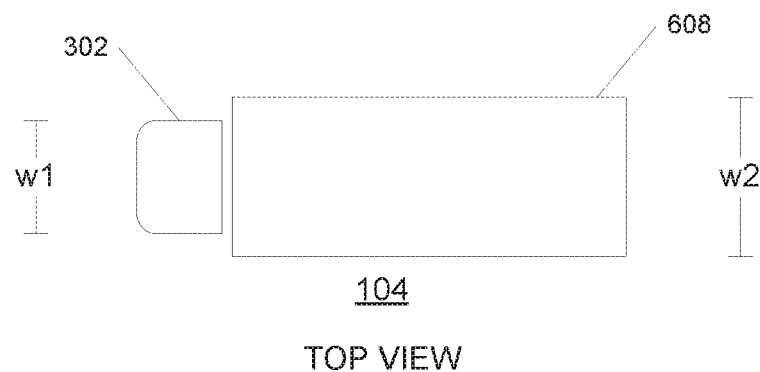

FIGS. 6A and 6B depict another example of attaching a cargo container to a vehicle according to example embodiments of the present disclosure.

As shown in FIGS. 6A and 6B, the cargo container 606 can be associated with a non-standard shape and/or size. With respect to FIG. 6A, when the cargo container 606 is securely attached to the vehicle base 304, a height $h_4$ can represent a height of the vehicle 104 from ground level to the top of the cargo container 606, and the height $h_4$ can be higher than the height $h_1$. With respect to FIG. 6B, when the cargo container 608 is securely attached to the vehicle base 304, a width $w_2$ can represent a width of the cargo container 608, the width $w_2$ can be wider than the width $w_1$. As discussed above with respect to FIG. 5, the vehicle 104 can include sensors 510, 512, 514, and 516 (not shown in FIG. 6) that can acquire sensor data 109 that indicates a shape and/or size of the cargo container 606/608. The sensors 510, 512, 514, and 516 can acquire sensor data 109 indicating that the cargo container 606 is associated with a non-standard shape and/or size that causes the cargo container 606 to be substantially higher in height than the front shield 302, and that the cargo container 608 is associated with a non-standard shape and/or size that causes the cargo container 608 to be substantially wider in width than the front shield 302. In some implementations, the cargo containers 606 and 608 can be the same cargo container that is both substantially higher and substantially wider than the front shield 302.

Figure 7:
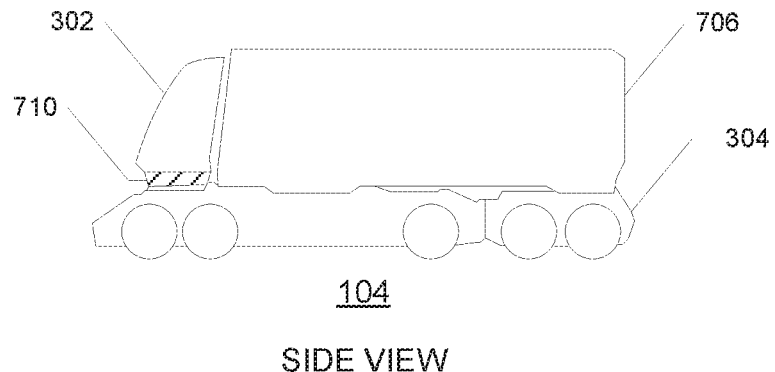
FIG. 7 depicts an example of adjusting a height associated with a front shield based on a cargo container attached to a vehicle according to example embodiments of the present disclosure.

FIG. 7 depicts an example of adjusting a height associated with a front shield based on a cargo container attached to a vehicle according to example embodiments of the present disclosure. As shown in FIG. 7, the front shield 302 can be attached to the vehicle base 304 of the vehicle 104 via a height adjustable platform 710. When a cargo container 706 is attached to the vehicle base 304 of the vehicle 104, the vehicle computing system 102 can determine a height associated with the cargo container 706 based on sensor data 109, and the vehicle computing system 102 can control the height adjustable platform 710 to adjust a height of the front shield 302 based on the height associated with the cargo container 706. In particular, the vehicle computing system 102 can raise a height of the front shield 302 to the height of the cargo container 706, or raise a height of the front shield 302 to a new height that is substantially closer to the height of the cargo container 706. Alternatively, if the height of the cargo container 706 is less than a height of the front shield 302, the vehicle computing system 102 can control the height adjustable platform 710 to lower a height of the front shield 302 to the height of the cargo container 706, or lower a height of the front shield 302 to a new height that is substantially closer to the height of the cargo container 706.

Figure 8A:
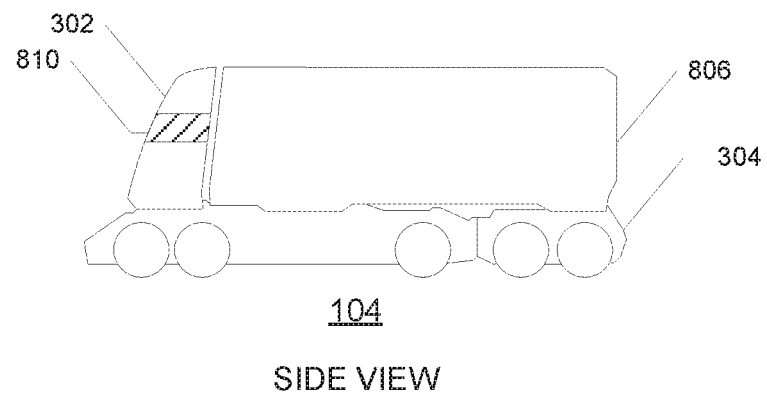
FIG. 8A-8B depict examples of expanding a panel associated with a front shield based on a height or width of a cargo container attached to a vehicle according to example embodiments of the present disclosure.

FIG. 8A depicts an example of expanding a panel associated with a front shield based on a cargo container attached to a vehicle according to example embodiments of the present disclosure. As shown in FIG. 8A, the front shield 302 can include an expandable panel 810 that can be incrementally expanded. When a cargo container 806 is attached to the vehicle base 304 of the vehicle 104, the vehicle computing system 102 can determine a height associated with the cargo container 806 based on sensor data 109, and the vehicle computing system 102 can control the expandable panel 810 to adjust a height of the front shield 302 based on the height associated with the cargo container 806. In particular, the vehicle computing system 102 can expand the expandable panel 810 to raise a height of the front shield 302 to the height of the cargo container 806, or to raise a height of the front shield 302 to a new height that is substantially closer to the height of the cargo container 806. Alternatively, if the height of the cargo container 806 is less than a height of the front shield 302, the vehicle computing system 102 can contract the expandable panel 810 to lower a height of the front shield 302 to the height of the cargo container 806, or lower a height of the front shield 302 to a new height that is substantially closer to the height of the cargo container 806.

Figure 8B:
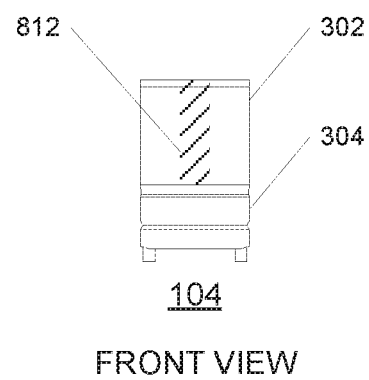

FIG. 8B depicts another example of expanding a panel associated with a front shield based on a cargo container attached to a vehicle according to example embodiments of the present disclosure. As shown in FIG. 8B, the front shield 302 can include an expandable panel 812 that can be incrementally expanded. When a cargo container 806 is attached to the vehicle base 304 of the vehicle 104, the vehicle computing system 102 can determine a width associated with the cargo container 806 based on sensor data 109, and the vehicle computing system 102 can control the expandable panel 812 to adjust a width of the front shield 302 based on the width associated with the cargo container 806. In particular, the vehicle computing system 102 can expand the expandable panel 810 to increase a width of the front shield 302 to the width of the cargo container 806, or to increase a width of the front shield 302 to a new width that is substantially closer to the width of the cargo container 806. Alternatively, if the width of the cargo container 806 is less than a width of the front shield 302, the vehicle computing system 102 can contract the expandable panel 812 to reduce a width of the front shield 302 to the width of the cargo container 806, or reduce a width of the front shield 302 to a new width that is substantially closer to the width of the cargo container 806.

Figure 9A:
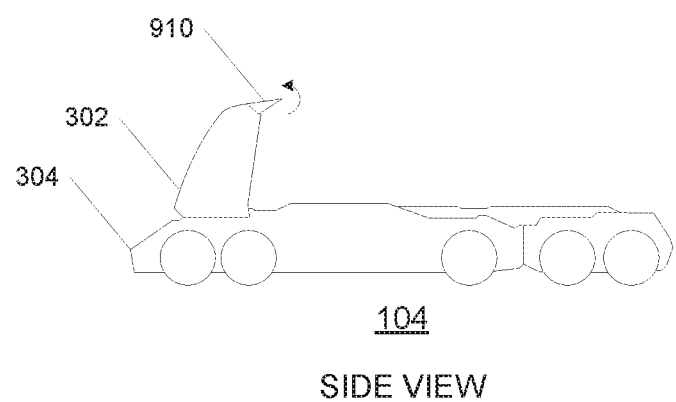
FIGS. 9A-9B depict an example of an articulating panel associated with a front shield according to example embodiments of the present disclosure.
Figure 9B:
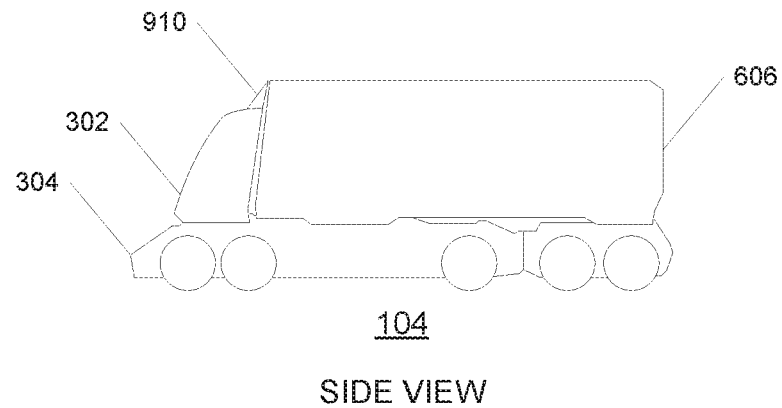

FIGS. 9A and 9B depict an example of an articulating panel associated with a front shield according to example embodiments of the present disclosure. As shown in FIG. 9A, the front shield 302 can include an articulating panel 910. When the vehicle computing system 102 determines that a cargo container will be attached to the vehicle base 304, the vehicle computing system 102 can position the articulating panel 910 to an opened position. As shown in FIG. 9B, when a cargo container 906 is attached to the vehicle base 304 of the vehicle 104, the vehicle computing system 102 can determine a height associated with the cargo container 906 based on sensor data 109, and the vehicle computing system 102 can control a position of the articulating panel 910 to adjust for the height associated with the cargo container 906. The vehicle computing system 102 can control the positon of the articulating panel 910 such the articulating panel 910 forms a surface that expands between the height of the front shield 302 and the height of the cargo container 906. The articulating panel 910 can be configured such that the surface formed by the articulating panel 910 can shield a top portion of the cargo container 906 in order to improve the aerodynamics of the vehicle 104 when transporting the cargo container 906. When the cargo container 906 is detached from the vehicle 104, the vehicle computing system 102 can control a position of the articulating panel 910 to be flush with a surface of the front shield 302.

Figure 10A:
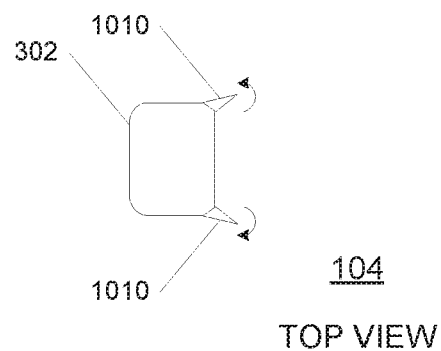
FIGS. 10A-10B depict an another example of an articulating panel associated with a front shield according to example embodiments of the present disclosure.
Figure 10B:
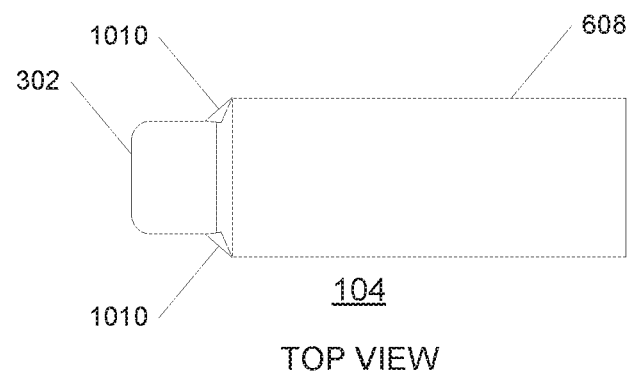

FIGS. 10A and 10B depict another example of an articulating panel associated with a front shield according to example embodiments of the present disclosure. As shown in FIG. 10A, the front shield 302 can include articulating panels 1010. When the vehicle computing system 102 determines that a cargo container will be attached to the vehicle base 304, the vehicle computing system 102 can position the articulating panels 1010 to an opened position. As shown in FIG. 10B, when a cargo container 1006 is attached to the vehicle base 304 of the vehicle 104, the vehicle computing system 102 can determine a width associated with the cargo container 1006 based on sensor data 109, and the vehicle computing system 102 can control a position of the articulating panels 1010 to adjust for the width associated with the cargo container 1006. The vehicle computing system 102 can control the positon of the articulating panels 1010 such the articulating panels 1010 form a surface that expands between the width of the front shield 302 and the width of the cargo container 1006 on either side of the vehicle 104. The articulating panels 1010 can be configured such that the surface formed by the articulating panels 1010 can shield a side portion on either side of the cargo container 1006 in order to improve the aerodynamics of the vehicle 104 when transporting the cargo container 1006. When the cargo container 1006 is detached from the vehicle 104, the vehicle computing system 102 can control a position of the articulating panels 1010 to be flush with a surface of the front shield 302.

In some implementations, the articulating panels 910 and/or 1010 can be articulated at different points within each panel. The vehicle computing system 102 can control a position the panels 910 and/or 1010 to create different shapes (e.g., different surface angles, different surface curves, etc.). In this way, the vehicle computing system 102 can adjust the front shield 302 to create different aerodynamic configurations.

Figure 11A:
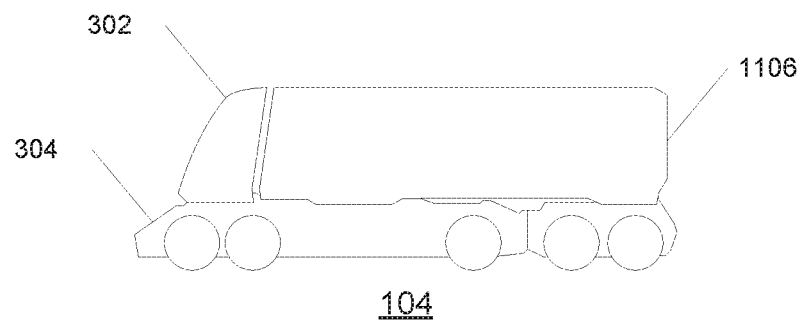
FIGS. 11A-11B depict an example of an articulating structure and flexible membrane associated with a front shield according to example embodiments of the present disclosure.
Figure 11B:
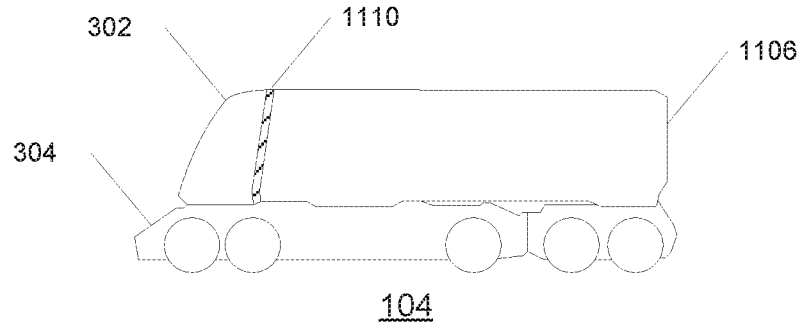

FIGS. 11A and 11B depict an example of an articulating structure and flexible membrane associated with a front shield according to example embodiments of the present disclosure. As shown in FIG. 11A, when a cargo container 1106 is attached to the vehicle base 304, there can remain a gap between the front shield 302 and the cargo container 1106. As shown in FIG. 11B, the vehicle computing system 102 can determine a height and width associated with the cargo container 1106 based on sensor data 109, and the vehicle computing system 102 can control a position of an articulating structure 1110 to fill in or cover any gaps between the front shield 302 and the cargo container 1106. The articulating structure 1110 can include a flexible membrane that is stretched over the structure to form a surface along the articulating structure 1110. The vehicle computing system 102 can control the articulating structure 1110 to create different shapes (e.g., different surface angles, different surface curves, etc.) with the flexible membrane that is stretched over the structure. In particular, the vehicle computing system 102 can control the articulating structure 1110 to form a surface that is flush with the front shield 302 on one end, and is flush with the cargo container 1106 on the other end.

Figure 12A:
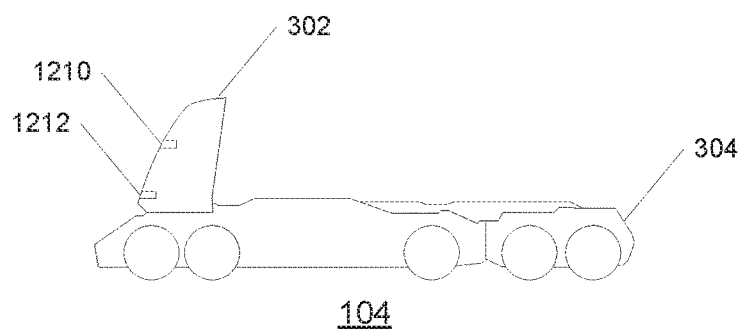
FIGS. 12A-12D depict an example of adjusting a configuration of sensors associated with a front shield according to example embodiments of the present disclosure.

FIGS. 12A-12D depict an example of adjusting a configuration of sensors associated with a front shield according to example embodiments of the present disclosure. As shown in FIG. 12A, the sensor(s) 108 can include sensors 1210 and 1212 that can be configured to acquire sensor data 109 associated with an environment in front of the vehicle 104. The sensors 1210 and 1212 can include, for example, a front-facing camera, a LIDAR, or other sensor and/or combination of sensors.

Figure 12B:
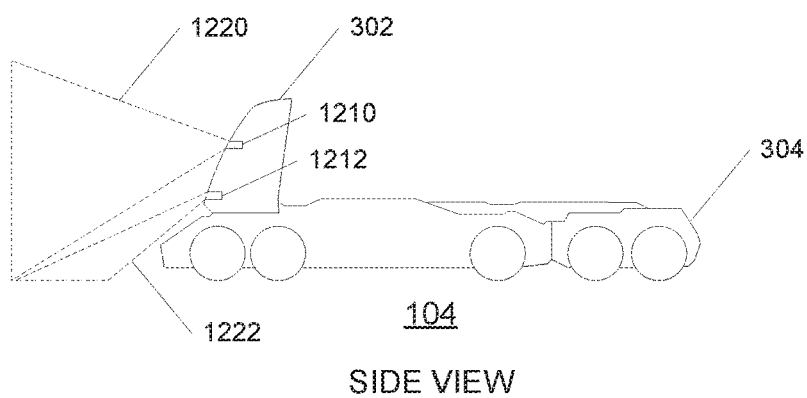

As shown in FIG. 12B, the sensors 1210 and 1212 can be configured to acquire sensor data 109 that corresponds to a particular field of view of the environment based on a position of the sensors 1210 and 1212 with respect to the vehicle 104. In particular, when the front shield 302 is in its opened position, the sensor 1210 can be configured to acquire sensor data 109 that corresponds to the view 1220 and the sensor 1212 can be configured to acquire sensor data 109 that corresponds to the view 1222. The view 1220 can be based on a height and orientation of the sensor 1210 with respect to the vehicle 104, and the view 1222 can be based on a height and orientation of the sensor 1212 with respect to the vehicle 104. In some implementations, the vehicle computing system 102 can use sensor data 109 that corresponds to the views 1220 and 1222 in order to attempt to comprehend the surrounding environment by performing various processing techniques on the sensor data 109, and generate an appropriate motion plan through such surrounding environment.

Figure 12C:
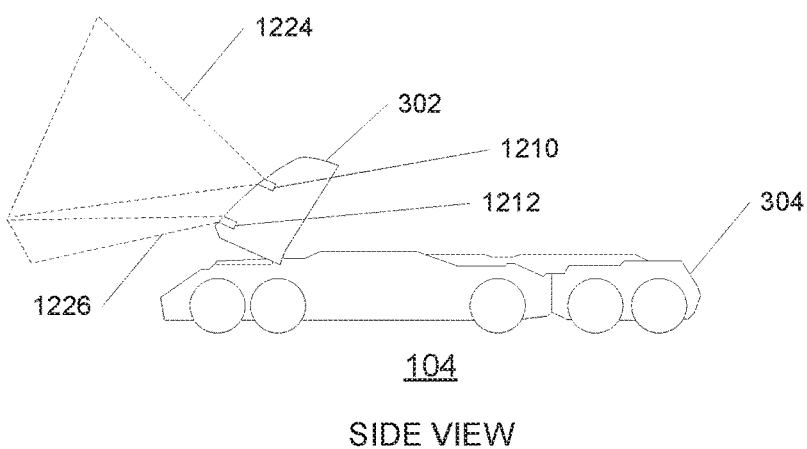

As shown in FIG. 12C, when the vehicle computing system 102 controls the front shield 302 to move between an opened position and a closed position, a height and orientation of the sensors 1210 and 1212 with respect to the vehicle 104 can change, thereby causing the sensors 1210 and 1212 to acquire sensor data that corresponds to the views 1224 and 1226, respectively. In some implementations, the vehicle computing system 102 can be unable to comprehend the surrounding environment based on sensor that corresponds to the views 1224 and 1226.

Figure 12D:
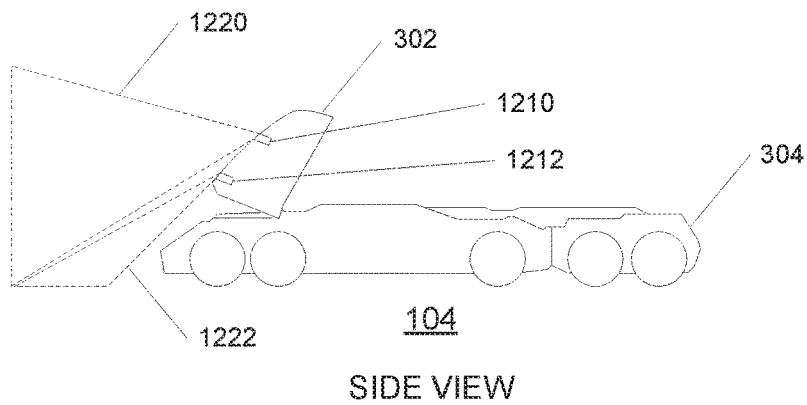

As shown in FIG. 12D, the vehicle computing system 102 can dynamically adjust a configuration of the sensors 1210 and 1212 in response to closing or opening the front shield 302. For example, the sensors 1210 and 1212 can each be provided with an independent actuator assembly, and the vehicle computing system 102 can control each actuator assembly to adjust the configuration of the sensors 1210 and 1212 independently of each other and/or one or more other sensor(s) 108.

In some implementations, one or more actuators associated with the folding system of the vehicle 104 can generate front shield data 272 indicating of a position of the front shield 302 (e.g., opened, closed, or between opened and closed; and an adjusted/expanded height when opened), and provide the front shield data 272 to the vehicle computing system 102 onboard the vehicle 104. The vehicle computing system 102 can determine a position (e.g., height and/or orientation) of the sensors 1210 and 1212 with respect to the vehicle 104, based on the front shield data 272. The vehicle computing system 102 can dynamically adjust a configuration of the sensors 1210 and 1212 based on the respective determined position so that the sensors 1210 and 1212 can continue providing sensor data 109 that corresponds to the views 1220 and 1222, respectively.

In some implementations, the vehicle computing system 102 can analyze sensor data 109 captured by the sensors 1210 and 1212 to determine a change in a field of view associated with the sensors 1210 and 1212. In particular, the vehicle computing system 102 can detect a change from view 1220 to view 1224 associated with the sensor 1210, and a change in view from view 1222 to 1226 associated with the sensor 1212, when the front shield 320 is moved to its closed position. The vehicle computing system 102 can detect the change in the field of view based on, for example, a detection/recognition of one or more objects in the sensor data 109, a change in location of a ground level in the sensor data 109, etc. The vehicle computing system 102 can dynamically adjust a configuration of the sensors 1210 and 1212 to correct for the detected change in the field of view so that the sensors 1210 and 1212 can continue providing sensor data 109 that corresponds to the views 1220 and 1222, respectively.

In some implementations, the sensor(s) 108 can include one or more supplemental sensors that can detect a change in position and/or orientation (e.g., gyroscope, accelerometer, etc.) of the front shield 302. The front shield 302 can include the supplemental sensor(s), for example, in proximity to each of the sensors 1210 and 1212. The supplemental sensor(s) can provide sensor data 109 indicating the change in position and/or orientation based on a position of the front shield 302 (e.g., opened, closed, or between opened and closed; and an adjusted/expanded height when opened). A vehicle computing system 102 onboard the vehicle 104 can analyze the sensor data 109 to determine the change in a field of view associated with the sensors 1210 and 1212, and dynamically adjust a configuration of the sensors 1210 and 1212 associated with the front shield 302 to correct for the determined change in the field of view so that the sensors 1210 and 1212 can continue providing sensor data 109 that corresponds to the views 1220 and 1222, respectively.

Figure 13A:
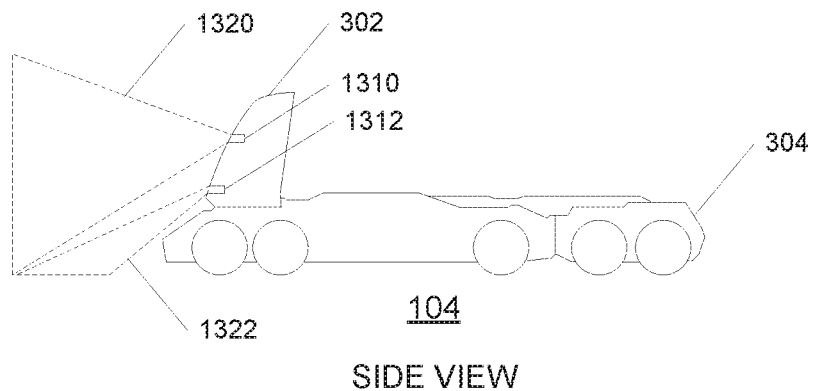
FIGS. 13A-13C depict an example of adjusting a configuration of sensors associated with a front shield according to example embodiments of the present disclosure.
Figure 13B:
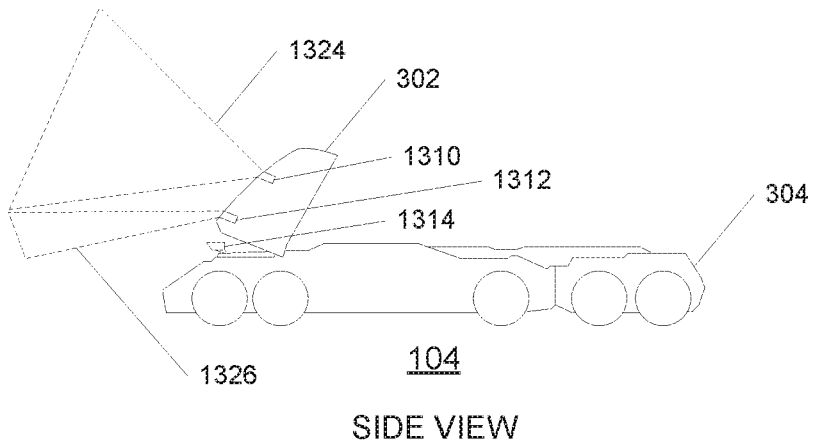
Figure 13C:
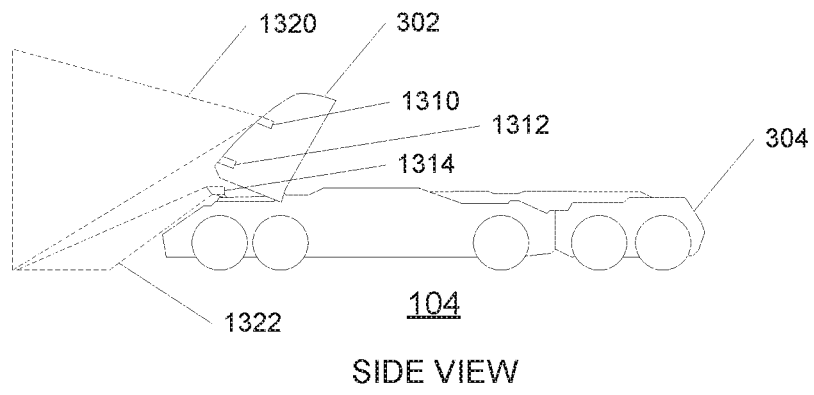

FIGS. 13A-13C depict an example of adjusting a configuration of sensors associated with a front shield according to example embodiments of the present disclosure. As shown in FIG. 13A, the sensor(s) 108 can include sensors 1310 and 1312 that can be configured to acquire sensor data 109 associated with an environment in front of the vehicle 104. The sensors 1310 and 1312 can include, for example, a front-facing camera, a LIDAR, or other sensor and/or combination of sensors. The sensors 1310 and 1312 can be configured to acquire sensor data 109 that corresponds to a particular field of view of the environment based on a position of the sensors 1310 and 1312 with respect to the vehicle 104. In particular, when the front shield 302 is in its opened position, the sensor 1310 can be configured to acquire sensor data 109 that corresponds to the view 1320 and the sensor 1312 can be configured to acquire sensor data 109 that corresponds to the view 1322. The view 1320 can be based on a height and orientation of the sensor 1310 with respect to the vehicle 104, and the view 1322 can be based on a height and orientation of the sensor 1312 with respect to the vehicle 104. In some implementations, the vehicle computing system 102 can use sensor data 109 that corresponds to the views 1320 and 1322 in order to attempt to comprehend the surrounding environment by performing various processing techniques on the sensor data 109, and generate an appropriate motion plan through such surrounding environment.

As shown in FIG. 13B, when the vehicle computing system 102 controls the front shield 302 to move between an opened position and a closed position, a height and orientation of the sensors 1310 and 1312 with respect to the vehicle 104 can change, thereby causing the sensors 1310 and 1312 to acquire sensor data that corresponds to the views 1324 and 1326, respectively. In some implementations, the vehicle computing system 102 can be unable to comprehend the surrounding environment based on sensor that corresponds to the views 1324 and 1326.

As shown in FIG. 13C, the sensor(s) 108 can include a sensor 1314 that can be configured to acquire sensor data 109 associated with an environment in front of the vehicle 104. The sensor 1314 can be configured to acquire sensor data 109 that corresponds to a particular field of view of the environment based on a position of the sensor 1314 with respect to the vehicle 104. In particular, when the front shield 302 is in its opened position, the sensor 1314 can be configured to acquire sensor data 109 that corresponds to the view 1322. The view 1322 can be based on a height and orientation of the sensor 1314 with respect to the vehicle 104.

In some implementations, the vehicle computing system 102 can dynamically adjust a configuration of the sensors 1310 and 1312 in response to closing or opening the front shield 302. For example, the sensor 1310 can each be provided with an independent actuator assembly, and the vehicle computing system 102 can control each actuator assembly to adjust the configuration of the sensor 1310 to acquire sensor data 109 that corresponds to the view 1320. Additionally, the vehicle computing system 102 can disable the sensor 1312 and enable the sensor 1314 to acquire sensor data 109 that corresponds to the view 1322.

FIGS. 14A-14C and 15A-15C depict examples of adjusting a configuration of marking lights associated with a front shield according to example embodiments of the present disclosure. The marking light(s) can be used to mark surfaces of the vehicle 104 for an observer viewing the vehicle 104. In particular, the marking light(s) can indicate a type of the vehicle 104 (e.g., car, truck, etc.) and a size of the vehicle 104 (e.g., width, height, etc.) to the observer. The marking light(s) can be adjustable (e.g., dynamically) in response to a position of a front shield.

Figure 14A:
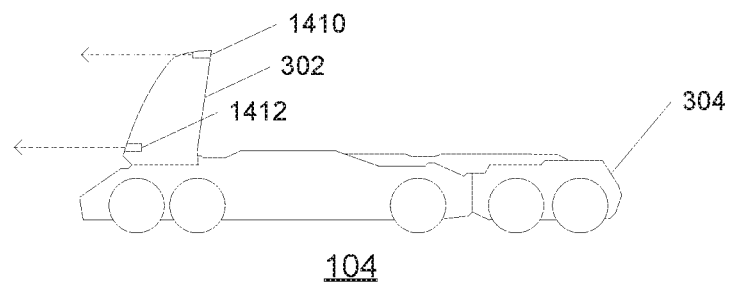
FIGS. 14A-14C depict an example of adjusting a configuration of marking lights associated with a front shield according to example embodiments of the present disclosure.
Figure 14B:
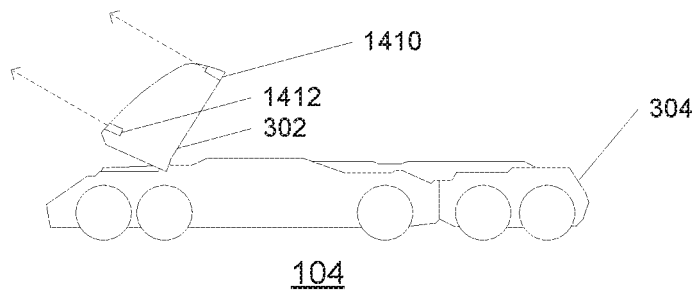
Figure 14C:
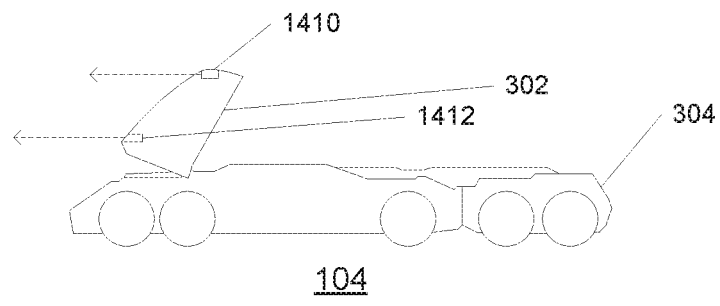

Referring to FIGS. 14A-14C, as shown in FIG. 14A, the marking lights can include marking lights 1410 and 1412 that can be configured to indicate a type and/or size of the vehicle 104. The marking lights 1410 and 1412 can include, for example, a front-facing LED or other light source and/or combination of light sources. The marking lights 1410 and 1412 can be configured to mark surfaces of the vehicle 104 for an observer viewing the vehicle 104 from the front side of the vehicle. The observer can observe light emitted by the marking lights 1410 and 1412 to determine a type and/or size of the vehicle 104. In particular, when the front shield 302 is in its opened position, the marking lights 1410 and 1412 can be configured to emit light in a direction substantially parallel to a direction of motion of the vehicle 104, and the marking lights 1410 and 1412 can each be associated with a first visibility based on the configuration. When the marking lights 1410 and 1412 are associated with the first visibility, the light emitted by the marking lights 1410 and 1412 can reach the observer. In this way, the marking lights 1410 can indicate a height and the marking light 1412 can indicate a midpoint of the vehicle 104 to the observer.

In some implementations, a marking light that indicates a midpoint of a vehicle can also indicate a type of the vehicle (e.g., a vehicle that includes a midpoint marking light is a truck-type vehicle). For example, the observer can determine a height of the vehicle based on observing the marking light 1410, and the user can determine a type of the vehicle (e.g., truck) based on observing the marking light 1412.

As shown in FIG. 14B, when the vehicle computing system 102 controls the front shield 302 to move between an opened position and a closed position, a position (e.g., height and/or orientation) of the marking lights 1410 and 1412 can change with respect to the vehicle 104. Due to the change in position, the marking lights 1410 and 1412 can become occluded by a portion of the vehicle 104 and/or emit light in a direction that is not substantially parallel to a direction of motion of the vehicle 104, and the marking lights 1410 and 1412 can each be associated with a second visibility based on the change in position. When the marking lights 1410 and 1412 are associated with the second visibility, the light emitted by the marking lights 1410 and 1412 may not reach the observer, or the light emitted by the marking lights 1410 and 1412 can indicate an incorrect height/midpoint of the vehicle 104 to the observer. In this case, the observer is prevented from being able to determine a type and/or size of the vehicle 104 based on light emitted by the marking lights 1410 and 1412.

As shown in FIG. 14C, the vehicle computing system 102 can dynamically adjust a configuration of the marking lights 1410 and 1412 in response to closing or opening the front shield 302. For example, the marking lights 1410 and 1412 can each be provided with an independent actuator assembly, and the vehicle computing system 102 can control each actuator assembly to adjust the configuration of the marking lights 1410 and 1412 independently of each other and/or one or more other marking lights. In particular, the vehicle computing system 102 can control each actuator assembly to adjust the configuration of the marking lights 1410 and 1412 to emit light in a direction substantially parallel to a direction of motion of the vehicle 104 and to indicate a correct height/midpoint of the vehicle 104 to the observer.

In some implementations, one or more actuators associated with the folding system of the vehicle 104 can generate front shield data 272 indicating of a position of the front shield 302 (e.g., opened, closed, or between opened and closed; and an adjusted/expanded height when opened), and provide the front shield data 272 to the vehicle computing system 102 onboard the vehicle 104. The vehicle computing system 102 can determine a position (e.g., height and/or orientation) of the marking lights 1410 and 1412 with respect to the vehicle 104, based on the front shield data 272. The vehicle computing system 102 can dynamically adjust a configuration of the marking lights 1410 and 1412 based on the respective determined position so that the marking lights 1410 and 1412.

In some implementations, the marking lights 1410 and 1412 can include one or more supplemental sensors that can detect a change in position and/or orientation (e.g., gyroscope, accelerometer, etc.) of the front shield 302. The front shield 302 can include the supplemental sensor(s), for example, in proximity to each of the marking lights 1410 and 1412. The supplemental sensor(s) can provide sensor data 109 indicating the change in position and/or orientation based on a position of the front shield 302 (e.g., opened, closed, or between opened and closed; and an adjusted/expanded height when opened). A vehicle computing system 102 onboard the vehicle 104 can analyze the sensor data 109 to determine the change in position of the front shield 302 and dynamically adjust a configuration of the marking lights 1410 and 1412 associated with the front shield 302 to correct for the determined change.

Figure 15A:
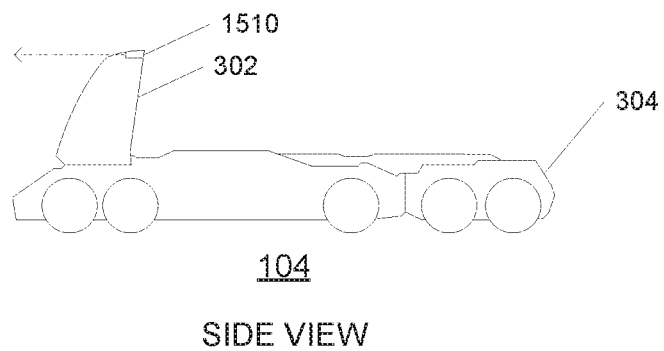
FIGS. 15A-15C depict another example of adjusting a configuration of marking lights associated with a front shield according to example embodiments of the present disclosure.
Figure 15B:
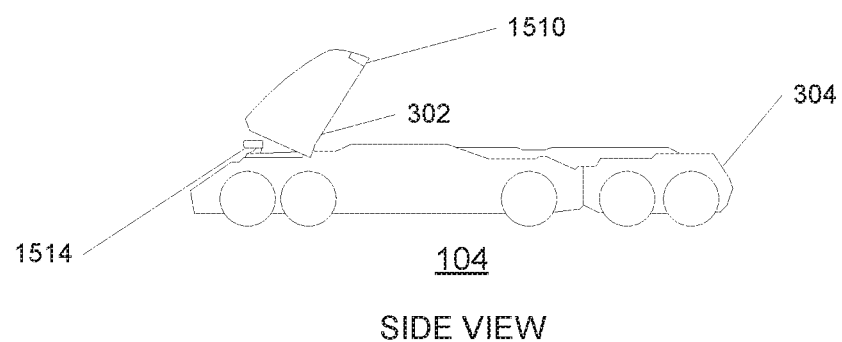
Figure 15C:
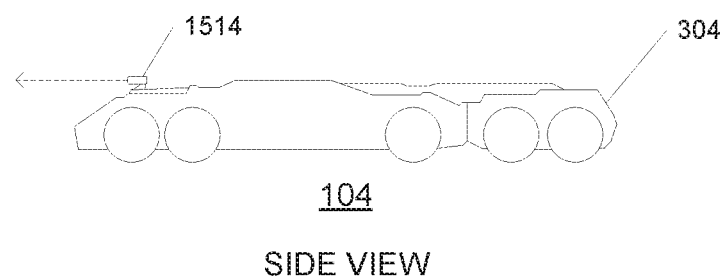

Referring to FIGS. 15A-15C, as shown in FIG. 15A, the marking lights can include marking light 1510 that can be configured to indicate a height of the vehicle 104 when the front shield 302 is in its opened position. The marking light 1510 can include, for example, a front-facing LED or other light source and/or combination of light sources. The marking light 1510 can be configured to mark surfaces of the vehicle 104 for an observer viewing the vehicle 104 from the front side of the vehicle. The observer can observe light emitted by the marking light 1510 to determine the height of the vehicle 104. In particular, when the front shield 302 is in its opened position, the marking light 1510 can be configured to emit light in a direction substantially parallel to a direction of motion of the vehicle 104. In this way, the marking light 1510 can indicate the height of the vehicle 104 to the observer, when the front shield is in its opened position.

As shown in FIG. 15B, the marking lights can include marking light 1514 that can be configured to indicate a height of the vehicle 104 when the front shield 302 is in its closed position. The marking light 1514 can be hidden when the front shield 302 is in its opened position and can become visible when the front shield 302 is in its closed position. Alternatively, the marking light 1514 can be always visible, and the vehicle computing system 102 can disable or enable the marking light 1514 when the front shield 302 is in its opened or closed position, respectively.

As shown in FIG. 15C, when the front shield 302 is in its closed position, the vehicle computing system 102 can enable the marking light 1514. In this way, the marking light 1510 can indicate the height of the vehicle 104 to the observer, when the front shield 302 is in its closed position.

Figure 16A:
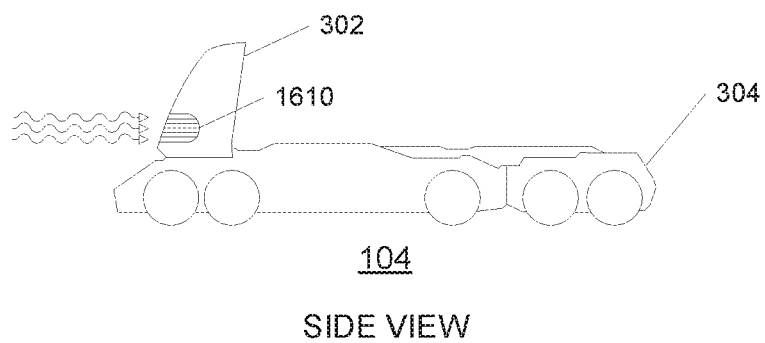
FIGS. 16A-16B depict an example of a cooling component associated with a front shield according to example embodiments of the present disclosure.
Figure 16B:
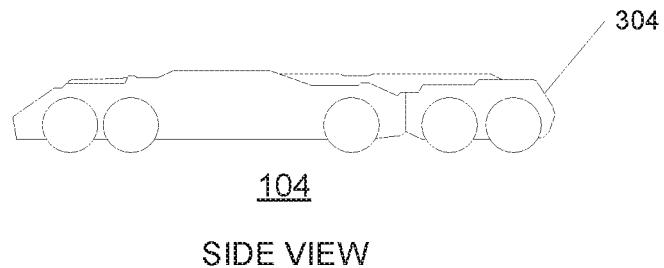

FIGS. 16A and 16B depict an example of a cooling component associated with a front shield according to example embodiments of the present disclosure.

As shown in FIG. 16A, a cooling component 1610 (e.g., radiator) can be associated with the front shield 302. The cooling component 1610 can be configured to help dissipate heat generated by the vehicle 104 during operation. The heat generated by the vehicle 104 can vary based on, for example, a load (e.g., cargo) being transported by the vehicle 104, ambient temperature of an environment proximate to the vehicle 104, a speed at which the vehicle 104 travels, etc. The cooling component 1610 can be further configured to face a direction of travel of the vehicle 104 and to dissipate heat to the air in the surrounding environment. When the heat generated by the vehicle 104 exceeds a threshold amount (e.g., when the vehicle 104 is transporting a cargo container, operating in a high-temperature environment, etc.), the vehicle computing system 102 can move the front shield 302 to its opened position in order to maximize the heat dissipation of the cooling component 1610. As shown in FIG. 16B, when the heat generated by the vehicle 104 is below a threshold amount, the vehicle computing system 102 can fold the front shield 302 to its closed position, thereby reducing an effectiveness of the cooling component 1610 but improving aerodynamics of the vehicle 104.

Figure 17:
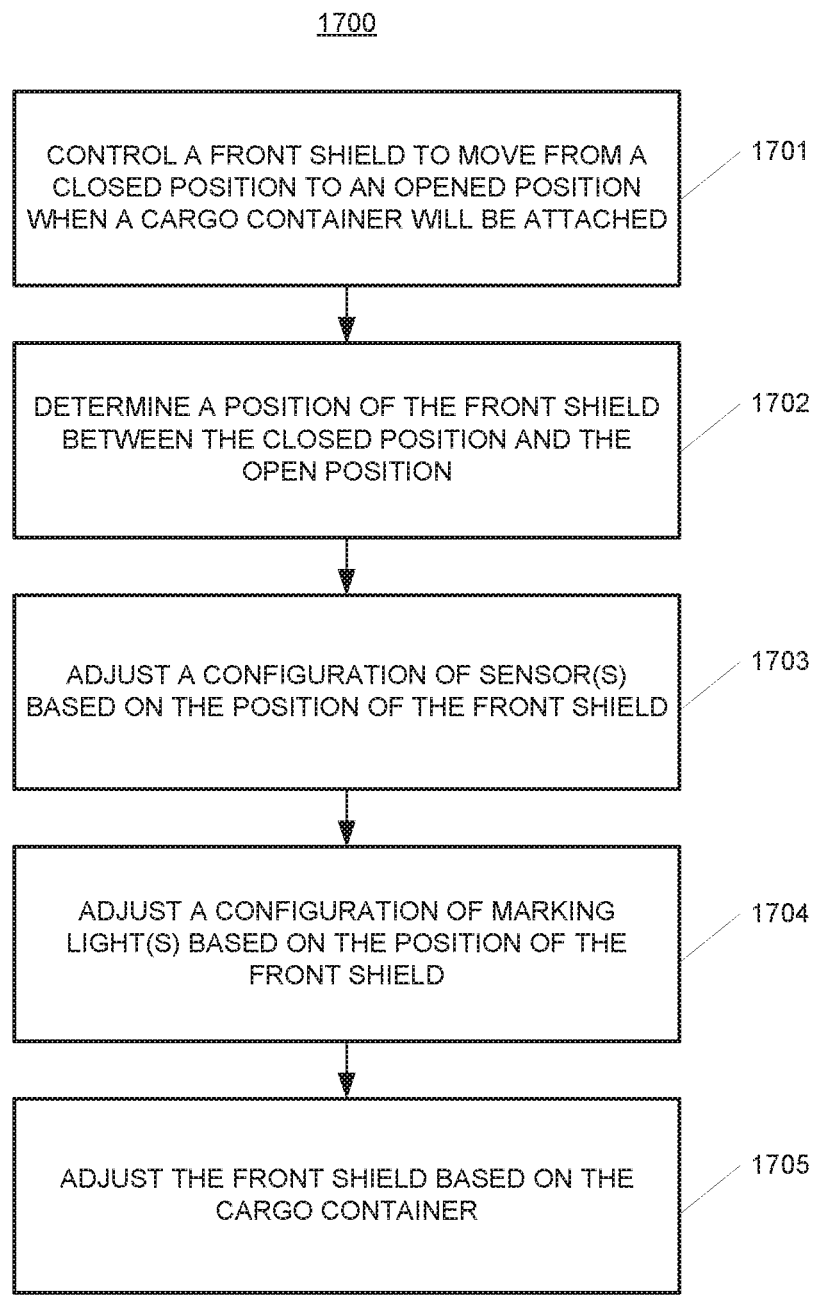
FIG. 17 depicts an example flow diagram for moving a front shield from a closed position to an opened position according to example embodiments of the present disclosure.
Figure 18:
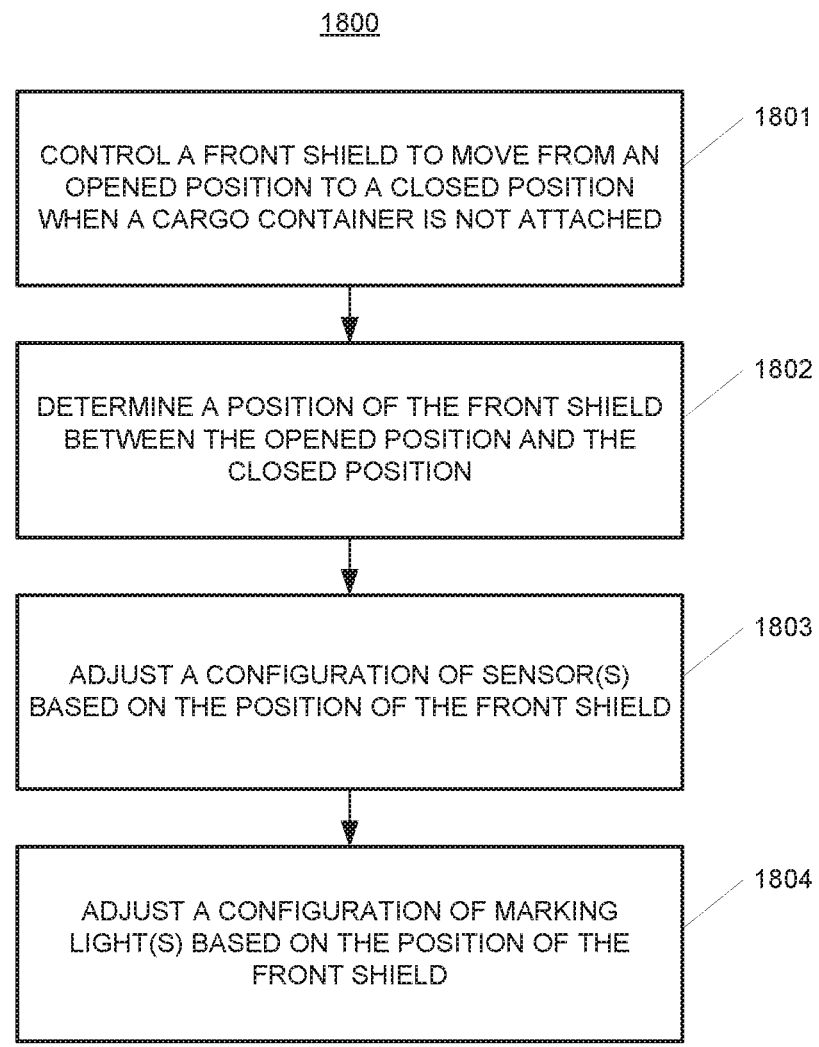
FIG. 18 depicts an example flow diagram for moving a front shield from a closed position to an opened position according to example embodiments of the present disclosure.

FIGS. 17 and 18 depict flow diagrams of example methods 1700 and 1800 for autonomous vehicle control according to example embodiments of the present disclosure. One or more portion(s) of the methods 1700 and 1800 can be implemented as operations by one or more computing system(s) such as, for example, computing device(s)/system(s) 102, 120, 1901, and 1910 shown in FIGS. 1, 2, and 19. For example, FIGS. 17 and 18 illustrate certain operations being performed by specific computing systems described herein. However, it should be appreciated that such operations may generally be performed by any suitable computing system or combination of computing systems consistent with the disclosure provided herein. Moreover, one or more portion(s) of the methods 1700 and 1800 can be implemented as an algorithm on the hardware components of the system(s) described herein (e.g., as in FIGS. 1, 2, and 19), for example, to monitor, estimate, and/or control an available capacity at a transfer hub for receiving one or more assets (e.g., autonomous vehicle(s) and/or cargo). FIGS. 17 and 18 depict elements performed in a particular order for purposes of illustration and discussion. Those of ordinary skill in the art, using the disclosures provided herein, will understand that the elements of any of the methods (e.g., of FIGS. 17 and 18) discussed herein can be adapted, rearranged, expanded, omitted, combined, and/or modified in various ways without deviating from the scope of the present disclosure.

FIG. 17 depicts an example flow diagram of a method 1700 for moving a front shield from a closed position to an opened position according to example embodiments of the present disclosure. At (1701), the method 1700 can include controlling a front shield to move from a closed position to an opened position when a cargo container will be attached. For example, the vehicle computing system 102 can determine whether a cargo container is attached, or will be attached, to the vehicle base 304 of the vehicle. The vehicle computing system 102 can receive an indication associated with an attachment of the cargo container, and determine whether the cargo container is attached, or will be attached, based at least in part on the indication. In particular, the vehicle computing system 102 can receive cargo container data 270 from the operations computing system 120, the cargo container data 270 indicating an attachment of the cargo container at a current time or at a future time. Additionally, or alternatively, the vehicle computing system 102 can obtain sensor data 109 from the cargo sensors 510 and 512, the sensor data 109 indicating an attachment of the cargo container. In response to determining that the cargo container is attached or will be attached to the vehicle base 304, the vehicle computing system 102 can control the front shield 302 to move from a closed position to an opened position that can shield a forward end of the cargo container.

At (1702), the method 1700 can include determining a position of the front shield 302 between the closed position and the opened position. For example, the vehicle computing system 102 can obtain front shield data 272 indicative of a position of the front shield 302. In some implementations, the vehicle computing system 102 can analyze sensor data 109 to determine a change in a field of view associated with one or more of the sensor(s) 108, in order to determine a position of the front shield 302. In some implementations, the vehicle computing system 102 can obtain sensor data 109 from one or more supplemental sensors that is indicative of a position of the front shield 302.

At (1703), the method 1700 can include adjusting a configuration of sensor(s) based on the position of the front shield. For example, the vehicle computing system 102 can adjust a configuration of the sensors 1210, 1212, 1310, 1312, and/or 1314. The vehicle computing system one into can adjust the configuration of one or more first sensors from the sensors 1210, 1212, 1310, 1312, and 1314, based at least in part on a position of the front shield 302 between its opened position and its closed position. In particular, the vehicle computing system 102 can determine a first field of view associated with the first sensors, determine a second field of view associated with the first sensors based at least in part on the position of the front shield 302, and adjust the configuration of the first sensors based at least in part on a change between the first field of view and second field of view. The vehicle computing system 102 can disable one or more of the first sensors, and enable one or more second sensors from the sensors 1210, 1212, 1310, 1312, and 1314 that are associated with the first field of view, in order to maintain the first field of view associated with the first sensors.

At (1704), the method 1700 can include adjusting a configuration of marking light(s) based on the position of the front shield. For example, the vehicle computing system 102 can adjust a configuration of the marking lights 1410, 1412, 1510, and/or 1514. The vehicle computing system 102 can adjust a configuration of one or more first marking lights from the marking lights 1410, 1412, 1510, and 1514, based at least in part on a position of the front shield 302 between its opened position and its closed position. In particular, the vehicle computing system 102 can determine a first visibility associated with the first marking lights, determine a second visibility associated with the first marking lights based at least in part on the position of the front shield 302, and adjust the configuration of the first marking lights based at least in part on a change between the first visibility and the second visibility. The vehicle computing system 102 can disable one or more of the first marking lights, and enable one or more second marking lights from the marking lights 1410, 1412, 1510, and 1514 that are associated with the first visibility, in order to maintain the first visibility associated with the first marking lights.

At (1705), the method 1700 can include adjusting the front shield based on the cargo container. For example, the vehicle computing system 102 can determine one or more dimensions associated with the cargo container. In some implementations, the vehicle computing system 102 can adjust a height and/or width of the front shield 302 based at least in part on a height and/or a width associated with the cargo container. In some implementations, the front shield 302 can include one or more panels, and the vehicle computing system 102 can expand the one or more panels based at least in part on one or more of the dimensions associated with the cargo container. In some implementations, the front shield 302 can include an articulating structure with a flexible membrane, and the vehicle computing system 102 can control the articulating structure to fill in all cover any gaps between the front shield 302 and the cargo container.

FIG. 18 depicts an example flow diagram of a method 1800 for moving a front shield from a closed position to an opened position according to example embodiments of the present disclosure. At (1801), the method 1800 can include controlling a front shield to move from an opened position to a closed position when a cargo container is not attached. For example, the vehicle computing system 102 can determine whether a cargo container is detached, or will be detached, to the vehicle base 304 of the vehicle. The vehicle computing system 102 can receive an indication associated with a detachment of the cargo container, and determine whether the cargo container is detached, or will be detached, based at least in part on the indication. In particular, the vehicle computing system 102 can receive cargo container data 270 from the operations computing system 120, the cargo container data 270 indicating a detachment of the cargo container. Additionally, or alternatively, the vehicle computing system 102 can obtain sensor data 109 from the cargo sensors 510 and 512, the sensor data 109 indicating a detachment of the cargo container. In response to determining that the cargo container is detached or will be detached from the vehicle base 304, the vehicle computing system 102 can control the front shield 302 to move from an opened position to a closed position in order to reduce a vertical profile of the vehicle 104.

At (1802), the method 1800 can include determining a position of the front shield 302 between the opened position and the closed position. For example, the vehicle computing system 102 can obtain front shield data 272 indicative of a position of the front shield 302. In some implementations, the vehicle computing system 102 can analyze sensor data 109 to determine a change in a field of view associated with one or more of the sensor(s) 108, in order to determine a position of the front shield 302. In some implementations, the vehicle computing system 102 can obtain sensor data 109 from one or more supplemental sensors that is indicative of a position of the front shield 302.

At (1803), the method 1800 can include adjusting a configuration of sensor(s) based on the position of the front shield. For example, the vehicle computing system 102 can adjust a configuration of the sensors 1210, 1212, 1310, 1312, and/or 1314. The vehicle computing system one into can adjust the configuration of one or more first sensors from the sensors 1210, 1212, 1310, 1312, and 1314, based at least in part on a position of the front shield 302 between its opened position and its closed position. In particular, the vehicle computing system 102 can determine a first field of view associated with the first sensors, determine a second field of view associated with the first sensors based at least in part on the position of the front shield 302, and adjust the configuration of the first sensors based at least in part on a change between the first field of view and second field of view. The vehicle computing system 102 can disable one or more of the first sensors, and enable one or more second sensors from the sensors 1210, 1212, 1310, 1312, and 1314 that are associated with the first field of view, in order to maintain the first field of view associated with the first sensors.

At (1804), the method 1800 can include adjusting a configuration of marking light(s) based on the position of the front shield. For example, the vehicle computing system 102 can adjust a configuration of the marking lights 1410, 1412, 1510, and/or 1514. The vehicle computing system 102 can adjust a configuration of one or more first marking lights from the marking lights 1410, 1412, 1510, and 1514, based at least in part on a position of the front shield 302 between its opened position and its closed position. In particular, the vehicle computing system 102 can determine a first visibility associated with the first marking lights, determine a second visibility associated with the first marking lights based at least in part on the position of the front shield 302, and adjust the configuration of the first marking lights based at least in part on a change between the first visibility and the second visibility. The vehicle computing system 102 can disable one or more of the first marking lights, and enable one or more second marking lights from the marking lights 1410, 1412, 1510, and 1514 that are associated with the first visibility, in order to maintain the first visibility associated with the first marking lights.

Figure 19:
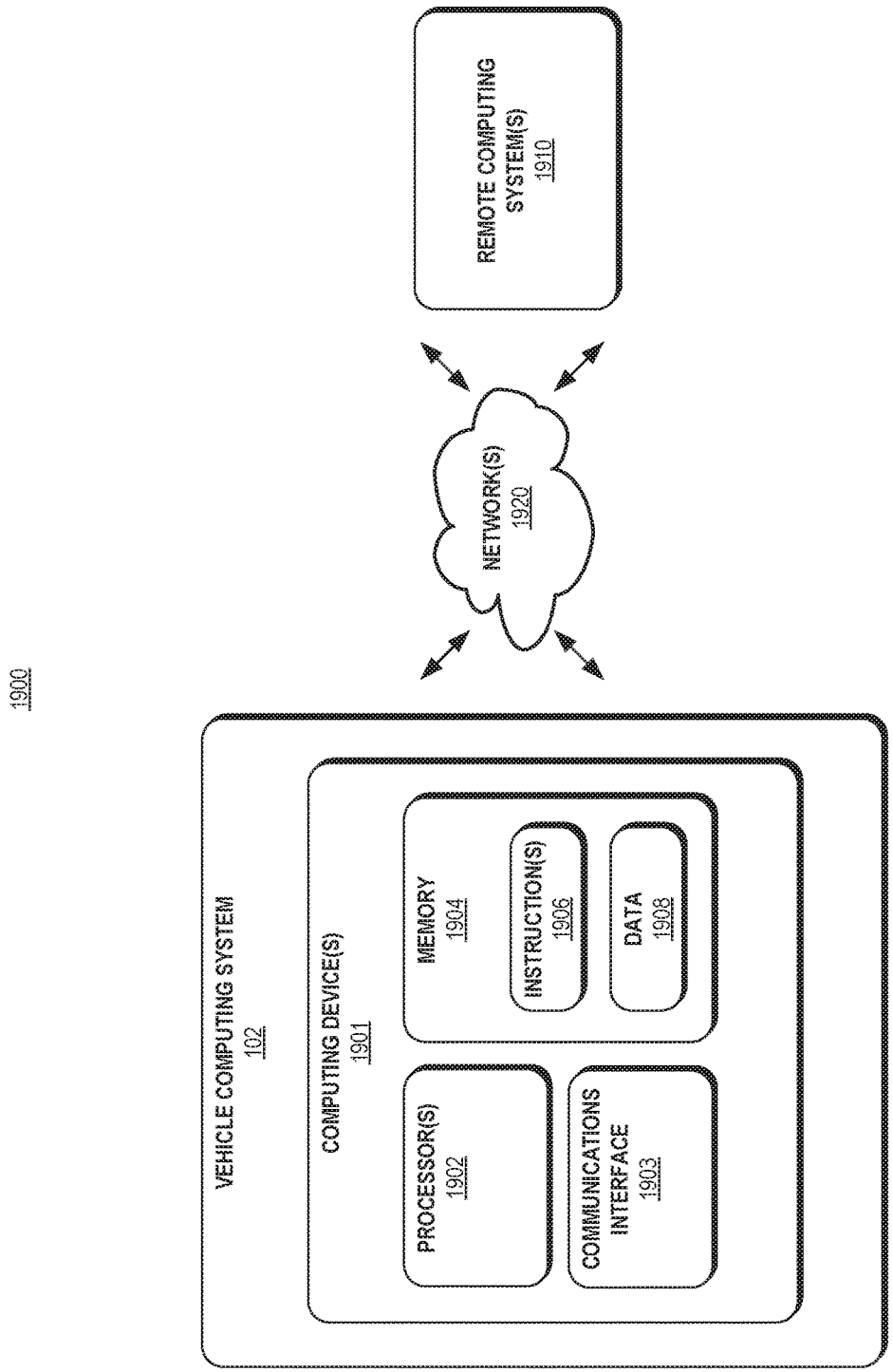
FIG. 19 depicts example system components according to example embodiments of the present disclosure.

FIG. 19 depicts an example computing system 1900 according to example embodiments of the present disclosure. The example system 1900 illustrated in FIG. 19 is provided as an example only. The components, systems, connections, and/or other aspects illustrated in FIG. 19 are optional and are provided as examples of what is possible, but not required, to implement the present disclosure. The example system 1900 can include the vehicle computing system 102 of the vehicle 104 and, in some implementations, remote computing system(s) 1910 including one or more remote computing systems that are remote from the vehicle 104 (e.g., operations computing system 120) that can be communicatively coupled to one another over one or more networks 1920. The remote computing system(s) 1910 can be associated with a central operations system and/or an entity associated with the vehicle 104 such as, for example, a vehicle owner, vehicle manager, fleet operator, service provider, etc.

The computing device(s) 1901 of the vehicle computing system 102 can include processor(s) 1902 and a memory 1904. The one or more processors 1902 can be any suitable processing device (e.g., a processor core, a microprocessor, an ASIC, a FPGA, a controller, a microcontroller, etc.) and can be one processor or a plurality of processors that are operatively connected. The memory 1904 can include one or more non-transitory computer-readable storage media, such as RAM, ROM, EEPROM, EPROM, one or more memory devices, flash memory devices, etc., and combinations thereof.

The memory 1904 can store information that can be accessed by the one or more processors 1902. For instance, the memory 1904 (e.g., one or more non-transitory computer-readable storage mediums, memory devices) on-board the vehicle 104 can include computer-readable instructions 1906 that can be executed by the one or more processors 1902. The instructions 1906 can be software written in any suitable programming language or can be implemented in hardware. Additionally, or alternatively, the instructions 1906 can be executed in logically and/or virtually separate threads on processor(s) 1902.

For example, the memory 1904 on-board the vehicle 104 can store instructions 1906 that when executed by the one or more processors 1902 on-board the vehicle 104 cause the one or more processors 1902 (the vehicle computing system 102) to perform operations such as any of the operations and functions of the vehicle computing system 102, as described herein, one or more operations of method 1300, and/or any other operations and functions of the vehicle computing system 102, as described herein.

The memory 1904 can store data 1908 that can be obtained, received, accessed, written, manipulated, created, and/or stored. The data 1908 can include, for instance, data associated with perception, prediction, motion plan, maps, cargo containers, front shield, and/or other data/information as described herein. In some implementations, the computing device(s) 1901 can obtain data from one or more memory device(s) that are remote from the vehicle 104.

The computing device(s) 1901 can also include a communication interface 1903 used to communicate with one or more other system(s) on-board the vehicle 104 and/or a remote computing device that is remote from the vehicle 104 (e.g., of remote computing system(s) 1910). The communication interface 1903 can include any circuits, components, software, etc. for communicating via one or more networks (e.g., 1920). In some implementations, the communication interface 1903 can include, for example, one or more of a communications controller, receiver, transceiver, transmitter, port, conductors, software, and/or hardware for communicating data.

The network(s) 1920 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1920 can be accomplished, for instance, via a communication interface using any type of protocol, protection scheme, encoding, format, packaging, etc.

The remote computing system 1910 can include one or more remote computing devices that are remote from the vehicle computing system 102. The remote computing devices can include components (e.g., processor(s), memory, instructions, data) similar to that described herein for the computing device(s) 1901. Moreover, the remote computing system(s) 1910 can be configured to perform one or more operations of the operations computing system 120, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle, comprising:
a vehicle base having a section defining a holding space;
a front shield movably attached to the vehicle base;
one or more processors; and
one or more tangible, non-transitory, computer readable media that collectively store instructions that when executed by the one or more processors cause the autonomous vehicle to perform operations, the operations comprising:
determining whether a cargo container will be attached to the vehicle base;
in response to determining that the cargo container will be attached to the vehicle base, controlling the front shield to move to an opened position that shields a forward end of the cargo container; and
in response to determining that the cargo container will not be attached to the vehicle base, controlling the front shield to move to a closed position to reduce a vertical profile of the autonomous vehicle, wherein at least a portion of the front shield folds into the holding space of the vehicle base in the closed position.

2. The autonomous vehicle of claim 1, wherein the operations further comprise:
adjusting at least one of a height or a width of the front shield based on a height or a width associated with the cargo container.

3. The autonomous vehicle of claim 1, wherein the front shield comprises one or more panels, and wherein the operations further comprise:
determining one or more dimensions associated with the cargo container; and
expanding the one or more panels of the front shield based on the one or more dimensions associated with a cargo container.

4. The autonomous vehicle of claim 1, wherein the operations further comprise:
determining a position of the front shield between the opened position and the closed position; and
adjusting a configuration of one or more first sensors or one or more first marking lights associated with the front shield based on the position of the front shield between the opened position and the closed position.

5. The autonomous vehicle of claim 4, wherein adjusting the configuration of the one or more first sensors comprises:

determining a first field of view associated with the one or more first sensors;
determining a second field of view associated with the one or more first sensors based on the position of the front shield; and
adjusting the configuration of the one or more first sensors based on a change between the first field of view and the second field of view.

6. The autonomous vehicle of claim 5, wherein the configuration of the one or more first sensors is adjusted to maintain the first field of view associated with the one or more first sensors.

7. The autonomous vehicle of claim 5, wherein adjusting the configuration of the one or more first sensors based on the change between the first field of view and the second field of view comprises:
disabling the one or more first sensors; and
enabling one or more second sensors associated with the autonomous vehicle, the one or more second sensors being associated with the first field of view, and being associated with the front shield or the vehicle base.

8. The autonomous vehicle of claim 4, wherein adjusting the configuration of the one or more first marking lights comprises:
determining a first visibility associated with the one or more first marking lights;
determining a second visibility associated with the one or more first marking lights based on the position of the front shield; and
adjusting a configuration of the one or more first marking lights based on a change between the first visibility and the second visibility.

9. The autonomous vehicle of claim 8, wherein the configuration of the one or more first marking lights is adjusted to maintain the first visibility associated with the one or more first marking lights.

10. The autonomous vehicle of claim 8, wherein adjusting the configuration of the one or more first marking lights based on the change between the first visibility and the second visibility comprises:
disabling the one or more first marking lights; and
enabling one or more second marking lights associated with the autonomous vehicle, the one or more second marking lights being associated with the first visibility, and being associated with the front shield or the vehicle base.

11. An autonomous vehicle, comprising:
a vehicle base that includes a first attachment point for attaching a cargo container;
a front shield that is movably attached to the vehicle base at a second attachment point located forward of the second attachment point relative to a forward direction of travel of the autonomous vehicle, wherein the front shield is configured to move between an opened position and a closed position, wherein the front shield includes one or more expandable panels configured for expanding to shield the cargo container based on one or more dimensions associated with the cargo container; and
a folding system configured to move the front shield between the opened position and the closed position.

12. The autonomous vehicle of claim 11, wherein the front shield is configured to move between a first height and a second height based on a height associated with the cargo container.

13. The autonomous vehicle of claim 11, wherein the front shield includes one or more sensors or one or more marking lights that are dynamically adjustable in
response to a position of the front shield between the opened position and the closed position, the one or more sensors or one or more marking lights being adjusted based on a field of view or visibility associated with the one or more sensors or one or more lights.

14. The autonomous vehicle of claim 11, wherein the folding system includes one or more sensors to determine a position of the front shield between the opened position and the closed position.

15. The autonomous vehicle of claim 11, wherein the folding system comprises at least one of a hydraulic actuator, linear actuator, mechanical latch, electromagnetic latch, and trapezoidal thread.

16. A computer-implemented method for autonomous vehicle control, the method comprising:
controlling, by a computing system that includes one or more computing devices, a front shield associated with an autonomous vehicle to move from a closed position to an opened position based on a determination that a cargo container is to be attached at a future time to a vehicle base associated with the autonomous vehicle; and
controlling, by the computing system, the front shield to move from the opened position to the closed position based on a determination that the cargo container is not attached to the vehicle base.

17. The computer-implemented method of claim 16, wherein controlling the front shield to move from the closed position to the opened position comprises:
receiving, by the computing system, an indication associated with a future attachment of the cargo container to the vehicle base; and
actuating, by the computing system, the front shield from the closed position to the opened position to shield a forward end of the cargo container in response to the indication.

18. The computer-implemented method of claim 16, wherein controlling the front shield to move from the opened position to the closed position comprises:
receiving, by the computing system, an indication associated with a detachment of the cargo container from the vehicle base; and
actuating, by the computing system, the front shield from the opened position to the closed position to reduce a vertical profile of the autonomous vehicle in response to the indication.

19. The computer-implemented method of claim 16, further comprising:
determining, by the computing system, one or more dimensions associated with the cargo container; and
expanding, by the computing system, one or more panels associated with the front shield based on the one or more dimensions associated with the cargo container.

20. An autonomous vehicle, comprising:
a vehicle base that includes a first attachment point for attaching a cargo container;
a front shield that is movably attached to the vehicle base at a second attachment point located forward of the second attachment point relative to a forward direction of travel of the autonomous vehicle, wherein the front shield is configured to move between an opened position and a closed position; and
a folding system configured to move the front shield between the opened position and the closed position, wherein the front shield includes one or more sensors or one or more marking lights that are dynamically adjustable in response to a position of the front shield between the opened position and the closed position, the one or more sensors or one or more marking lights being adjusted based on a field of view or visibility associated with the one or more sensors or one or more lights.

* * * * *